(12) United States Patent
Luzinov et al.

(10) Patent No.: US 11,051,529 B2
(45) Date of Patent: Jul. 6, 2021

(54) PROGRAMMABLE POLYMER CAFFEINE EXTRACTION

(71) Applicant: The Decaf Company, LLC, Danville, CA (US)

(72) Inventors: Igor Luzinov, Seneca, SC (US);
Ruslan Burtovyy, Anderson, SC (US);
Iurii Bandera, Central, SC (US);
James P. Farr, Danville, CA (US);
William P. Sibert, Danville, CA (US);
Wayne Delker, Danville, CA (US);
Michael J. Petrin, Danville, CA (US)

(73) Assignee: The Decaf Company, LLC, Naples, FL (US)

( * ) Notice: Subject to any disclaimer, the term of this patent is extended or adjusted under 35 U.S.C. 154(b) by 49 days.

(21) Appl. No.: 16/011,326

(22) Filed: Jun. 18, 2018

(65) Prior Publication Data

US 2018/0325138 A1    Nov. 15, 2018

Related U.S. Application Data

(63) Continuation-in-part of application No. 14/993,898, filed on Jan. 12, 2016, now abandoned.
(Continued)

(51) Int. Cl.
*A23F 5/20* (2006.01)
*B01D 15/38* (2006.01)
(Continued)

(52) U.S. Cl.
CPC .............. *A23F 5/223* (2013.01); *A23F 3/385* (2013.01); *B01D 15/20* (2013.01);
(Continued)

(58) Field of Classification Search
CPC ......... A23F 5/223; A23F 3/385; B01D 15/20; B01D 15/3852; C08F 212/36;
(Continued)

(56) References Cited

U.S. PATENT DOCUMENTS

| | | | |
|---|---|---|---|
| 5,587,273 A | 12/1996 | Yan et al. | |
| 5,630,978 A * | 5/1997 | Domb | B01J 20/268 264/330 |

(Continued)

FOREIGN PATENT DOCUMENTS

| | | | |
|---|---|---|---|
| EP | 0925776 A2 | 6/1999 | |
| GB | 2418428 A | 3/2006 | |
| JP | 01148150 A * | 6/1989 | ............... B28C 5/32 |

OTHER PUBLICATIONS

Villamena et al, Caffeine selectivity of divinylbenzene crosslinked polymers in aqueous media, Jul. 2001, Journal of Applied Polymer Science, vol. 82, Issue 1. (Year: 2001).*

*Primary Examiner* — Matthew O Savage
(74) *Attorney, Agent, or Firm* — Michael Petrin; Antero, Turmey & Petrin

(57) ABSTRACT

The invention relates to a caffeine-templated MIP copolymer matrix and devices employing these polymers that exhibit high absorbance or binding capacity for caffeine while retaining rapid caffeine uptake kinetics, and which function in both cold and hot aqueous environments to selectively remove caffeine from a beverage with a high selectivity factor in order to better preserve the sensory aspects of the decaffeinated beverage, and which can easily be used by a typical consumer to treat their beverage within a short time frame of less than about one minute. More specifically, the invention relates to copolymeric MIP matrices produced according to methods wherein the template to polymer ratio is dramatically increased in order to raise the affinity of the resulting MIP materials, and hyper-cross-
(Continued)

linked MIP matrices produced using higher amounts of crosslinking agents to produce high affinity copolymer matrices that better maintain a high degree of selectivity towards caffeine while minimizing the uptake of congeners to better maintain the sensory characteristics of the decaffeinated beverages. The invention further relates to manual and mechanical devices employing the inventive MIP matrices in a variety of physical forms and configurations that enable a user to decaffeinate a beverage manually or automatically within one minute or less, or select a level of decaffeination by controlling the exposure time to said devices.

6 Claims, 8 Drawing Sheets

Related U.S. Application Data

(60) Provisional application No. 62/125,168, filed on Jan. 13, 2015.

(51) Int. Cl.
| | |
|---|---|
| *A23F 5/22* | (2006.01) |
| *A23F 3/38* | (2006.01) |
| *B01J 20/26* | (2006.01) |
| *B01J 20/28* | (2006.01) |
| *C08F 220/14* | (2006.01) |
| *C08F 212/36* | (2006.01) |
| *B01D 15/20* | (2006.01) |
| *C08K 5/101* | (2006.01) |
| *C08K 5/23* | (2006.01) |
| *C08K 5/29* | (2006.01) |
| *C08K 5/3415* | (2006.01) |
| *C08K 5/3492* | (2006.01) |

(52) U.S. Cl.
CPC ........ *B01D 15/3852* (2013.01); *B01J 20/268* (2013.01); *B01J 20/2804* (2013.01); *B01J 20/28023* (2013.01); *B01J 20/28026* (2013.01); *C08F 212/36* (2013.01); *C08F 220/14* (2013.01); *C08K 5/101* (2013.01); *C08K 5/23* (2013.01); *C08K 5/29* (2013.01); *C08K 5/3415* (2013.01); *C08K 5/34926* (2013.01)

(58) Field of Classification Search
CPC .... C08F 220/14; B01J 20/268; B01J 20/2804; B01J 20/28023; B01J 20/28026; C08K 5/23; C08K 5/29; C08K 5/101; C08K 5/3415; C08K 5/34926
USPC ........................................... 426/422; 210/692
See application file for complete search history.

(56) References Cited

U.S. PATENT DOCUMENTS

| | | |
|---|---|---|
| 5,959,050 A | 9/1999 | Mosbach et al. |
| 6,322,834 B1 | 11/2001 | Leone |
| 6,391,359 B2 | 5/2002 | Leone |
| 6,783,686 B2 | 8/2004 | Leone et al. |
| 7,001,963 B2 | 2/2006 | Kulkarni et al. |
| 7,337,782 B2 | 3/2008 | Thompson |
| 7,476,316 B2 | 1/2009 | Southard |
| 7,750,090 B2 | 7/2010 | Sellegren et al. |
| 8,021,893 B2 | 9/2011 | Takeuchi |
| 8,086,415 B2 | 12/2011 | Chen et al. |
| 8,252,876 B2 | 8/2012 | Yilmaz et al. |
| 8,287,908 B2 | 10/2012 | Kristensen et al. |
| 8,337,967 B2 | 12/2012 | Ozawa et al. |
| 2007/0128423 A1 | 6/2007 | Belfort et al. |
| 2008/0214405 A1 | 9/2008 | Chen et al. |
| 2009/0194481 A1 | 8/2009 | Yilmaz et al. |
| 2012/0270964 A1 | 10/2012 | Piletsky et al. |
| 2012/0276386 A1 | 11/2012 | Peppas et al. |
| 2015/0021263 A1 | 1/2015 | Leone |

* cited by examiner

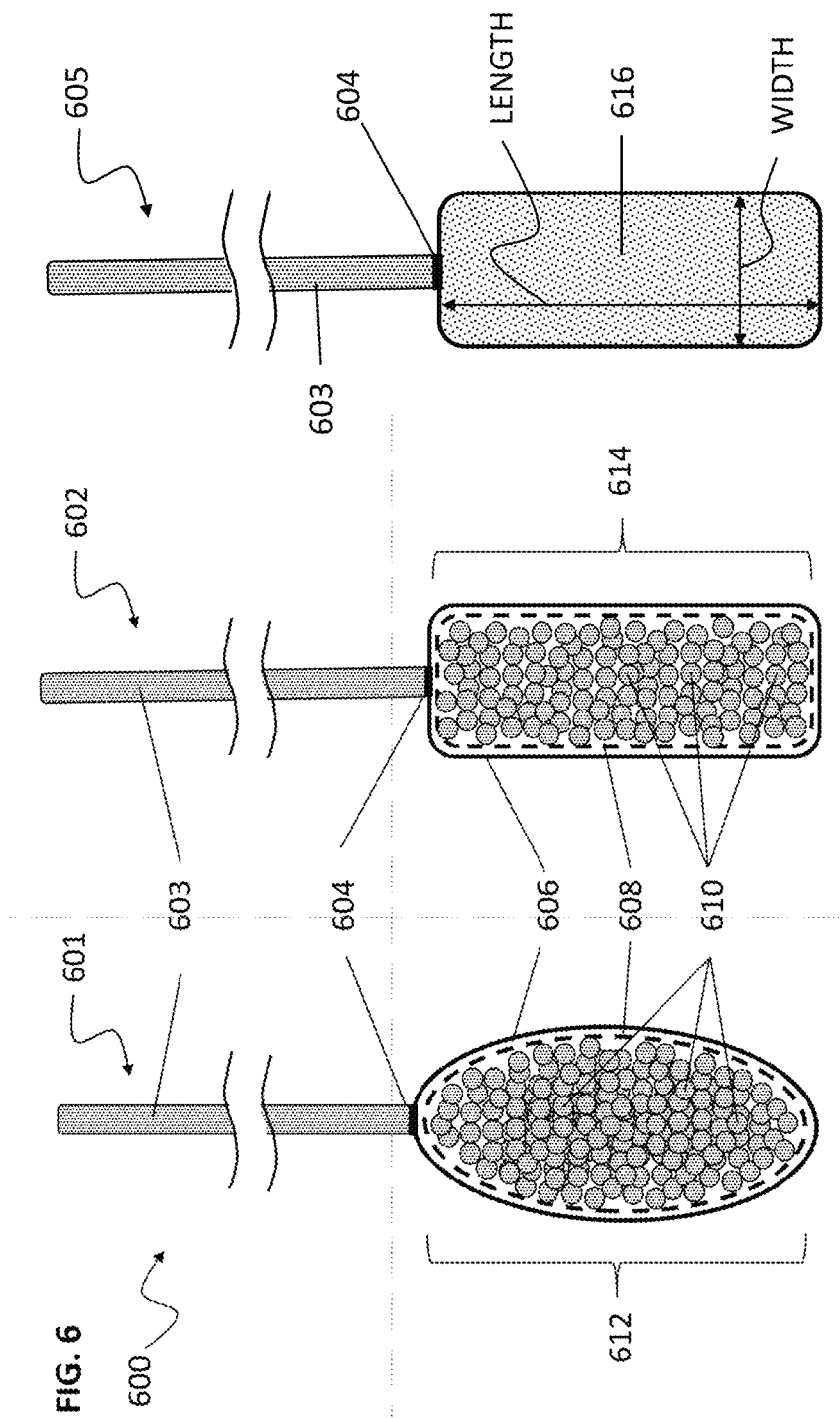

PROGRAMMABLE POLYMER CAFFEINE EXTRACTION

This provisional application claims the benefit of the priority of the following United States patent applications: U.S. Provisional Application No. 62/125,168, filed on Jan. 13, 2015, and U.S. Utility application Ser. No. 14/993,898 (also published as U.S. Publication No. 20160199752A1), filed on Jan. 12, 2016, both of which are hereby incorporated in their entirety by reference herein.

BACKGROUND

Various approaches have been taken to facilitate the removal or reduction of caffeine levels in beverages containing this active ingredient, such as for example, coffee and tea, both having varying, but typically significantly high levels of caffeine and related molecular compounds present that combine to create a sensorial perception that provide the beverages with their own unique appearance, odor and taste, particularly when the coffee beans or tea leaves are brewed or extracted using hot or boiling water in the tradition means of preparation.

Common approaches to decaffeinate coffee beans and tea leaves include treatment with methylene chloride, which is a solvent particularly adept at solubilizing and removing the caffeine component. However, the solvent also removes molecularly similar moieties (congeners) present and so acts to alter the odor and taste of the coffee beverage ultimately prepared using the decaffeinated beans or grounds. Further, health and environmental concerns in using a chlorinated solvent act to disfavor this method, particularly owing to potential residuals of the solvent and solvated impurities that may be introduced during the process.

More recently, alternative and healthier approaches such as the use of supercritical carbon dioxide have become more widely used, eliminating concerns of residual solvents and impurities, as the carbon dioxide solvent used is typically derived from a gaseous source that is then liquified under high pressures and/or low temperatures to produce a liquid form of carbon dioxide in a supercritical phase that has high solvency and can be handled, pumped, and then recovered easily for re-use in the process, and/or released to the environment without any detrimental effect. However, carbon dioxide in its supercritical or liquid phase still behaves like a solvent, and while solubilizing and removing caffeine, its properties also cause it to remove other moieties, such as for example, alkaloids, aromatics, amines, acids and aldehydes present that chemically resemble the caffeine molecule.

Further, both of these methods are complex, requiring industrial machinery and so are typically relegated to larger scale commercial processes, producing the decaffeinated coffee bean or grounds, or decaffeinated tea leaves that are then purchased by a consumer to prepare them in beverage form. One promising approach that has been proposed to enable a typical consumer to decaffeinate their own beverages on demand is the use of polymer systems that absorb caffeine from aqueous solutions and beverages, and in particular, molecularly imprinted polymers (MIPs) that have been "imprinted" or polymerized in the presence of caffeine as a target imprinted entity (TIE) so as to create holes or templated binding sites with the polymer after polymerization is complete and the imprinted entity or template is subsequently removed, leaving those binding sites open and configured to facilitate the uptake and binding of caffeine when the extracted MIP is contacted with the caffeinated beverage.

However, MIPs disclosed to date all suffer from one or more deficiencies. When optimizing to enhance the uptake and binding of a particular TIE such as caffeine, current systems suffer from poor selectivity, often undesirably removing similar moieties and thus negatively impacting the perceived appearance, odor and taste of the treated coffee beverage. When optimizing to enhance the selectivity of a MIP system to caffeine, resulting materials either exhibit reduced absorption or binding capacity for caffeine, and/or reduced uptake speed or absorption kinetics, making them unsuitable for use as either larger amounts of polymer are required that are impractical, or longer treatment times are required that are unreasonable with respect to a consumer timeframe in preparing a hot beverage for consumption, e.g., a minute or two.

Accordingly, what is needed is a caffeine-templated MIP system that exhibits high absorbance or binding capacity for caffeine while retaining rapid caffeine uptake kinetics, and which functions in both cold and hot aqueous environments to selectively remove caffeine from a beverage with a high selectivity factor in order to better preserve the sensory aspects of the decaffeinated beverage, and which can easily be used by a typical consumer to treat their beverage within a short time frame of less than about one minute.

Also desirable is a combined MIP system comprising a caffeine-templated MIP primary system as described herein used with an acrylamide-templated MIP secondary system, the latter materials being produced in a similar manner to those of the caffeine-templated systems, produced MIP matrices that effectively remove any trace amounts of acrylamide present in the treated beverage in addition to the removal of caffeine by the primary MIP matrices.

SUMMARY

The present invention relates generally to a novel molecularly imprinted polymer (MIP) matrix with increased binding capacity, increased material selectivity and possessing rapid absorption kinetics used in a device to rapidly decaffeinate a high caffeine-content containing beverage.

The present invention relates more specifically to novel copolymer systems synthesized as three-dimensional (3-D) molecularly imprinted polymer matrices (MIPs) using a high molar ratio of target imprinted entity (TIE) moieties as imprinting molecules to form a plurality of highly TIE-selective binding sites within the matrix while maintaining high capacity absorption capability and rapid absorption kinetics preferentially favoring uptake of the imprinted TIE, here caffeine.

The present invention relates more specifically to hyper-crosslinked copolymer systems synthesized as three-dimensional (3-D) molecularly imprinted polymer matrices (MIPs) using a high molar ratio of target imprinted entity (TIE) moieties as imprinting molecules combined with a high ratio of crosslinker molecules to form highly TIE-selective binding sites within the matrix while maintaining high capacity absorption capability and rapid absorption kinetics preferentially favoring uptake of the caffeine.

The present invention relates more specifically to hyper-crosslinked copolymer systems synthesized as three-dimensional (3-D) molecularly imprinted polymer matrices (MIPs) using a high molar ratio of target imprinted entity (TIE) moieties as imprinting molecules combined with a high ratio of crosslinker molecules to form highly TIE-selective binding sites within the matrix while maintaining high capacity absorption capability and rapid absorption kinetics preferentially favoring uptake of caffeine.

The present invention further relates to the use of pre-hydrated forms of the inventive hyper-crosslinked MIP copolymer systems in a single-use device designed to maximize initial or instantaneous fluidic interaction of a beverage to be decaffeinated with the MIP matrices to more rapidly achieve a high degree of decaffeination within a shorter period of time, without significantly altering the taste preference, color preference and odor preference of the beverage after the decaffeination process is performed.

The present invention also relates to the use of pre-hydrated forms of the inventive MIP copolymer systems produced using higher molar ratios of target template entities (TIEs) in a single-use device designed to maximize initial or instantaneous fluidic interaction of a beverage to be decaffeinated with the MIP matrices to more rapidly achieve a high degree of decaffeination within a shorter period of time, without significantly altering the taste preference, color preference and odor preference of the beverage after the decaffeination process is performed.

OBJECTS OF THE INVENTION

One object of the present invention is a single use device for decaffeination of a serving-sized volume of a caffeinated beverage comprising a treatment means having a handle portion and a submersible portion connected thereto for the insertion of said submersible portion of said device into a liquid beverage by means of said handle portion; a lower region of said handle portion being connected to an upper region of said submersible portion; an upper region of said handle portion being manipulable by hand; wherein said submersible portion comprises a molecularly imprinted polymer (MIP) matrix in a form selected from a plurality of particles, beads and fibers, a sheet, a foamed block, and combinations thereof; wherein said MIP or polymer matrix comprises a molecularly imprinted copolymer of divinylbenzene monomer and methylmethacrylic acid having a respective molar ratio of between 80:20 and 95:5; wherein said polymer matrix is capable of absorbing at least 25 milligrams of molecular caffeine per gram of said molecularly imprinted copolymer within 60 seconds of submersion within said caffeinated beverage; wherein said molecularly imprinted copolymer is formed as a three-dimensional polymer matrix in the presence of a target imprinted entity dispersed in a solvent carrier, optionally including at least one absorption aid selected from a porogen, free-radical initiator, cross-linker, cosolvent, or combination thereof; wherein said target imprinted entity is molecular caffeine; and wherein said serving-sized volume is a volume of liquid between 100 to 500 milliliters.

Another object of the present invention is a device as described hereinabove wherein the caffeinated beverage is selected from coffee, tea and carbonated drinks containing caffeine.

A further object of the present invention is a device employing a molecularly imprinted polymer (MIP) copolymer having a respective divinylbenzene monomer to methylmethacrylic acid molar ratio of 80:20, or alternatively of 85:15, or alternatively of 90:10, or yet alternatively of 95:5.

Yet another object of the present invention is a device employing a MIP copolymer formed in the presence of a target imprinted entity present at a level equivalent to a molar ratio of said target imprinted entity to total copolymer material (T:P) of between 1:1 and 4:1.

In a related object of the present invention is a device employing a MIP copolymer having a molar ratio of template moiety to polymer (T:P) of between 1.5:1 and 4:1.

In yet another related object of the present invention is a device employing a MIP copolymer matrix formed in the presence of an adsorption aid; wherein said adsorption aid is an additional cross-linker present at a level equivalent to a mass ratio of total polymer to cross-linker (P:C) of between 90:1 and 25:1, or alternatively between 60:1 and 30:1.

Another object of the present invention is a device employing a MIP copolymer matrix wherein the respective divinylbenzene monomer to methylmethacrylic acid molar ratio is between 85:15; wherein said copolymer is formed in the presence of a target imprinted entity present at a level equivalent to a molar ratio of said target imprinted entity to total copolymer material (T:P) of between 1:1 and 4:1; and wherein said copolymer is formed in the presence of an adsorption aid; wherein said adsorption aid is a cross-linker present at a level equivalent to a mass ratio of total polymer to cross-linker (P:C) of between 90:1 and 25:1.

A further object of the present invention is a device employing the disclosed MIP copolymers wherein the polymer matrices are pre-hydrated prior to use with a mass of water present at a level with respect to the absolute dry weight of said polymer matrix equivalent to a hydration level of between 1 and 75 wt. %, or alternatively between 10 to 50 wt. %.

Yet another object of the present invention is a device employing a MIP copolymer having a respective divinylbenzene monomer to methylmethacrylic acid molar ratio of between 85:15; wherein said copolymer is formed in the presence of a target imprinted entity present at a level equivalent to a molar ratio of said target imprinted entity to total copolymer material (T:P) of between 1:1 and 4:1; and wherein said copolymer is formed in the presence of an adsorption aid; wherein said adsorption aid is an additional cross-linker present at a level equivalent to a mass ratio of total copolymer to cross-linker (P:C) of between 90:1 and 25:1; and wherein said copolymer is in the form of a polymer matrix that is pre-hydrated prior to use with a mass of water present at a level with respect to the absolute dry weight of said polymer matrix equivalent to a hydration level of between 1 and 75 wt. %.

A further object of the present invention is a device employing a MIP copolymer formed using one or more of a cross-linker selected from azo-bis-isobutyronitrile, N-5-azido-2-nitrobenzoyloxysuccinimide, 1-ethyl-3-(3-dimethylaminopropyl)carbodiimide hydrochloride, N-hydroxysuccinimide, para-methyl styrene, butyl acrylate, butyl methacrylate, diallyl phthalate, 1,3-butanediol dimethylacrylate, diallyl isophthalate, octyl acrylamide, trimethylol propane triacrylate, triallyl cyanurate, triallyl isocyanurate and diallyl maleate, and combinations thereof.

An additional object of the present invention is a device employing a MIP copolymer that exhibits a relative caffeine absorptivity level of greater than 80 wt. % removal from a caffeinated beverage having at least 100 milligram of caffeine per liter when said device is submerged in said caffeinated beverage for a duration of no more than 60 seconds.

A related object of the present invention is a device employing a MIP copolymer that further exhibits a caffeine selectivity factor with respect to 3,7-dimethyl xanthine of equal to or greater than 1.7.

Another related object of the present invention is a device employing a MIP copolymer that further exhibits a caffeine selectivity factor with respect to chlorogenic acid of equal to or greater than 1.75.

Yet another related object of the present invention is a device employing a MIP copolymer that further exhibits a caffeine selectivity factor with respect to theophylline of equal to or greater than 8.0.

An additional object of the present invention is a device for decaffeination of a beverage convenient for manual manipulation by hand, having a handle portion and a submersible portion that further comprises a containment means surrounding a plurality of individual polymer matrices when said polymer matrix is in the form of a plurality of particles or beads; wherein said containment means is in the form of a mesh; wherein said mesh is porous to water and has a plurality of openings having an average pore size distribution that is less than the average particle size distribution of said plurality of particles or beads; wherein said containment means is secured to said lower region of said handle portion.

In a related object of the present invention is a device for decaffeination of a beverage wherein a submersible portion comprises a shaped collection of fibers when said polymer matrix is in the form of a plurality of fibers; wherein said fibers are configured to form a stable non-woven construct capable of substantially maintaining its original dimensional shape and size after submersion in said liquid beverage for at least one minute. In a related embodiment of the above, is a device for decaffeination of a beverage wherein said submersible portion comprises a shaped polymer matrix in the form of a compressed assembly of particles, fibers, unitary foam block or micro-foamed structure in a shape selected from a cylinder, sleeve, tube, or similar frusto-cylindrically shaped liner, or alternatively present in the form of a coating of said shaped polymer matrix applied to at least one interior surface of a receptive cup or pod; wherein said shaped polymer matrix is sized to fit within said receptive cup or pod and be substantially submerged when a beverage to be decaffeinated is poured or charged into the interior of said receptive cup or pod; and wherein said handle portion is optional.

In another related object of the present invention is a device for decaffeination of a beverage wherein a submersible portion comprises a polymer matrix in the form of a sheet gathered in a fan folded configuration with one or a plurality of vertically orientated creases having a plurality of folds selected from V, N, M and W-folded configurations, and an attachment means securing an upper proximate portion of said gathered sheet in said fan folded configuration to said lower region of said handle portion; and optionally a securement means securing said plurality of folds located at the lower distal portion of said gathered sheet in said fan folded configuration.

Yet another related object of the present invention is a device for decaffeination of a beverage wherein a submersible portion comprises a polymer matrix in the form of a unitary foam block in a shape selected from a cylinder, tube, rod, disc, donut, plate, plank and combinations thereof; wherein said foam block has at least one vertical cross-sectional dimension that is greater in size than the largest horizontal dimension of said foam block; and wherein an upper portion of said foam block is secured to said lower region of said handle, and optionally wherein said foam block is in the form of a micro-foamed open cell polymer matrix.

A final object of the present invention is a method for decaffeination of a serving-sized volume of a caffeinated beverage, the method comprising the steps of first (a) selecting a caffeinated beverage; then (b) partially submerging a single use device in said beverage for a time period of less than or equal to one minute; and then (c) removing said device from said beverage within said time period; wherein said single use device comprises: (i) a treatment means having a handle portion and a submersible portion connected thereto for the insertion of said submersible portion of said device into a liquid beverage by means of said handle portion; a lower region of said handle portion being connected to an upper region of said submersible portion; an upper region of said handle portion being manipulable by hand; wherein said submersible portion comprises a polymer matrix in a form selected from a plurality of particles, beads and fibers, a sheet, a foamed block and combinations thereof; wherein said polymer matrix comprises a molecularly imprinted copolymer of divinylbenzene monomer and methylmethacrylic acid having a respective molar ratio of between 80:20 and 95:5; wherein said polymer matrix is capable of absorbing at least 25 milligrams of molecular caffeine per gram of said molecularly imprinted copolymer within 60 seconds of submersion within said caffeinated beverage; wherein said molecularly imprinted copolymer is formed as a three-dimensional polymer matrix in the presence of a target imprinted entity dispersed in a solvent carrier, optionally including at least one absorption aid selected from a porogen, free-radical initiator, cross-linker, cosolvent, or combination thereof; wherein said target imprinted entity is molecular caffeine; and wherein said serving-sized volume is a volume of liquid between 100 to 300 milliliters.

These and further objects of the present invention are included in this specification as disclosed and described in greater detail in the following embodiments presented hereinbelow.

BRIEF DESCRIPTION OF THE DRAWINGS

FIG. 6 shows a diagram of several embodiments of a device for the instant decaffeination of a beverage by immersion.

Figure 1:
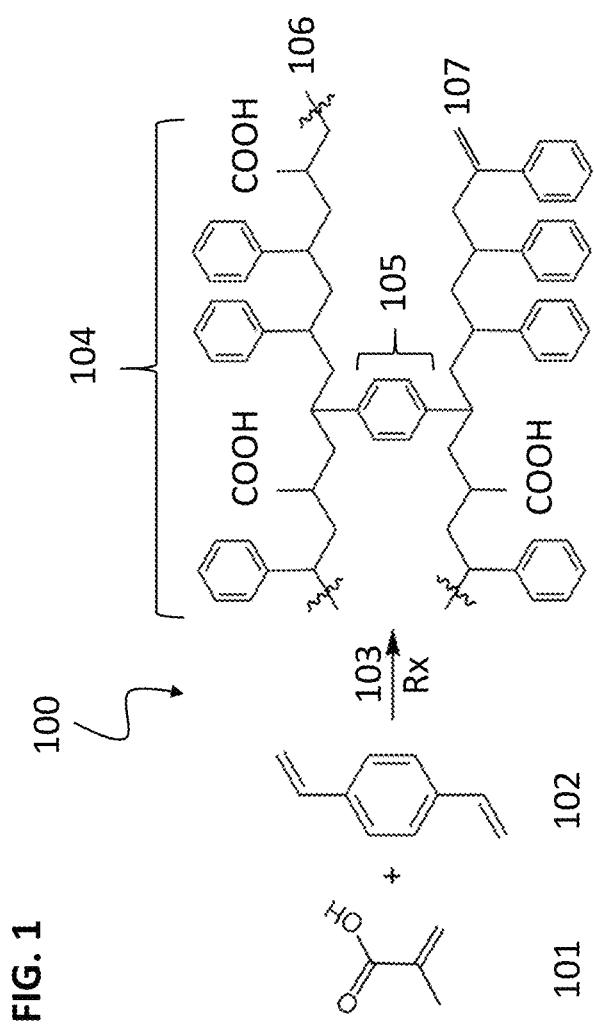
FIG. 1 shows a reaction schematic representing general synthesis of an inventive copolymer.

A corresponding Figure Key to aid in the identification of, functioning and further detailing the specific components, parts, regions, steps and means of the present invention as shown in the included figures and drawings is attached hereto in the Appendix.

DESCRIPTION

Generality of Invention

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Read this application with the following terms and phrases in their most general form. The general meaning of each of these terms or phrases is illustrative, not in any way limiting.

DETAILED DESCRIPTION

FIG. 1 shows a reaction diagram 100 representing the general synthetic approach to producing a MAA:DVB copolymer using monomers of methylmethacrylic acid 101 (MMA) and divinyl benzene 102 (DVB), which can be combined at any desired relative molar ratio, under reaction conditions 103, which generally involve use of one or more solvents, optionally including an absorption aid selected from a porogen, free-radical initiator, crosslinker, cosolvent, or combination thereof, and heat or UV irradiation to promote polymerization. A porogen is defined as a compatible material that promotes the formation of an open pore structure in the resulting inventive copolymer matrix following synthesis, and may be either soluble, or miscible with the one or more solvents employed, or selected from a material that functions as a solvent or reaction carrier (host) as well. The methylmethacrylic acid will lose a proton in aqueous solutions at pH's above pH 3 or so, the pKa (the logarithm of the equilibrium acid-base dissociation constant) or 50% neutralization point of a carboxylic acid moiety being around 5.5, so that this monomer provides some degree of both hydrophilic and ionic properties to the overall copolymer. Typically, brewed coffee exhibits a measured solution pH of between 5 and 6. In FIG. 1, the MMA monomers are shown in their acidic, or protonated state. The divinyl benzene 102 monomer has an aromatic functionality that is shared with caffeine and other related aromatic components of coffee and brewed coffee beverages, believed to be the reason that non-imprinted polymer systems (NIPS) have some native affinity to bind and/or absorb caffeine and related components even in the absence of molecular imprinting, which as discussed hereinbelow, may adversely limit the selectivity of molecularly templated imprinted polymers (MIPS) imprinted with a specific moiety, such as caffeine here, as the native aromatic affinity is likely to attract and bind other closely related aromatic moieties present in addition to the caffeine which is the desired target for reduction in a treated beverage. FIG. 1 shows the formation of dual monomer containing chain segments 104, continuing on both the left and right sides of the segment 104 shown, which illustrates one possible order for the assembled monomers, which can link and be distributed in any order, typically being a random distribution, as well as some monomers 102 acting to form crosslinked segments 105 where that monomer acts to bridge two otherwise relatively linear copolymer segments together forming a linkage, as opposed to continuing chain building of the linear extent of the chain 106 or forming a chain-termination segment 107 beyond which no additional monomers add during the synthesis. During the polymerization reaction, both linear chain building and crosslinking reactions can occur, generally randomly, but the relative amount of materials, additional crosslinking agents, and corresponding reaction conditions can be adjusted in order to enhance or reduce the degree of crosslinking in the final resulting copolymer, as discussed further hereinbelow. Not shown, but typically present in the reaction 103 process is a solubilizing carrier or solvent that can dissolve or uniformly disperse the reactive ingredients, and other optional synthetic aids and absorption aids, such as for example, but not limited to, initiators, promoters, free-radical stabilizers and termination agents known in the art, as well as template materials (TIES) discussed below. Suitable solvents include water, hydrocarbons such as alkanes and alcohols, aromatic solvents such as benzene, toluene as well as chlorinated compounds thereof, ethers and esters of hydrocarbons, condensed gasses such as supercritical liquid carbon dioxide and the lower n-alkyl alkanes (such as propane and butane and their isomeric compounds), and mixtures thereof. In some instances, a second solvent, or cosolvent can act as a porogen to increase the pore size (porosity) of the resulting polymer matrix, and/or to increase the binding efficacy (absorption properties) of the resulting polymer matrix by interacting with the TIE material during the templating process to modify the binding site properties.

In forming a three dimensional (3-D) molecularly imprinted polymer (MIP) matrix, the above reaction scheme is followed but the polymerization process is carried out with some level of a desired template molecule or target imprinted entity (TIE) also being present, solubilized or dispersed throughout the reaction media. During the polymerization process, chain-building and crosslinking types of assemblies are formed, providing the resulting MIP matrix with a 3-D structure wherein the TIEs are retained in a plurality of binding sites or cavities within the matrix, the components of which (atoms and molecularly segments) necessarily orientate themselves during the synthesis process to minimize the energy of interaction between the embedded TIE and the various chains, segments, cross linkage segments and terminal segments of the copolymer as it is formed. Owing to the solvent and optionally additional porogen materials present during synthesis, the resulting 3-D structure of the inventive copolymers features a plurality of pores, being openings and open passages, albeit tortuous on a microscopic scale, that enable a contacting fluid to wet, penetrate and flow through the internal interstitial region of the 3-D structure. Greater amounts of porogen can be used, selectively with regard to other solvents present, to increase the internal porosity of the resulting copolymer solids when formed. After copolymer formation, a solvent is then used to flush out and remove the TIE materials to the greatest extent possible, leaving behind a plurality of empty binding sites or cavities that typically show an enhanced binding affinity for the TIE, so that the resulting MIP will have the property of selectively binding and removing that particular TIE from a solution, such as for example an aqueous, water containing caffeinated beverage like coffee. The next step, although the TIE removal step can also be performed subsequently, is to grind the 3-D (three dimensional) polymer matrix into finer pieces or particles having smaller or finer particle sizes, which act so as to increase the relative surface area of the resulting polymer form collective, as well as improving handling characteristics of the material and improving performance characteristics of the MIP particles as well, as explored hereinbelow in greater detail. One aspect of reducing the particle size of the resulting MIPS is exposing or bringing more TIE binding sites closer to the surface of the MIP, increasing the first template extraction efficacy (absorption) so as to provide a larger number of empty template sites, which bears on the ultimate uptake capacity ($Q_{max}$) as well as non-equilibrium binding kinetics or rates of uptake ($k_c$). Another aspect of reducing the particle size is to improve the surface area of contact between the plurality of MIP particles and the beverage, typically liquid and aqueous in nature, to be treated by contact with the MIP particles, which then act to absorb or take-up any TIE molecules present in the beverage. A key advantage of MIPs is their generally high degree of specificity for the TIE molecule, so that generally no other extraneous materials are absorbed by the MIP, and even similarly sized and relatively similar chemical moieties are not preferentially absorbed or taken-up by the polymer matrix. In the case of treating a brewed beverage such as tea or coffee, the resulting brews can have a surprisingly large number of chemical constituents, numbering into the hundreds and perhaps thousands of compounds, some of which closely resemble caffeine, having a similar aromatic core structure and substituents, such as for example, but not limited to theophylline and theobromine.

Figure 5:
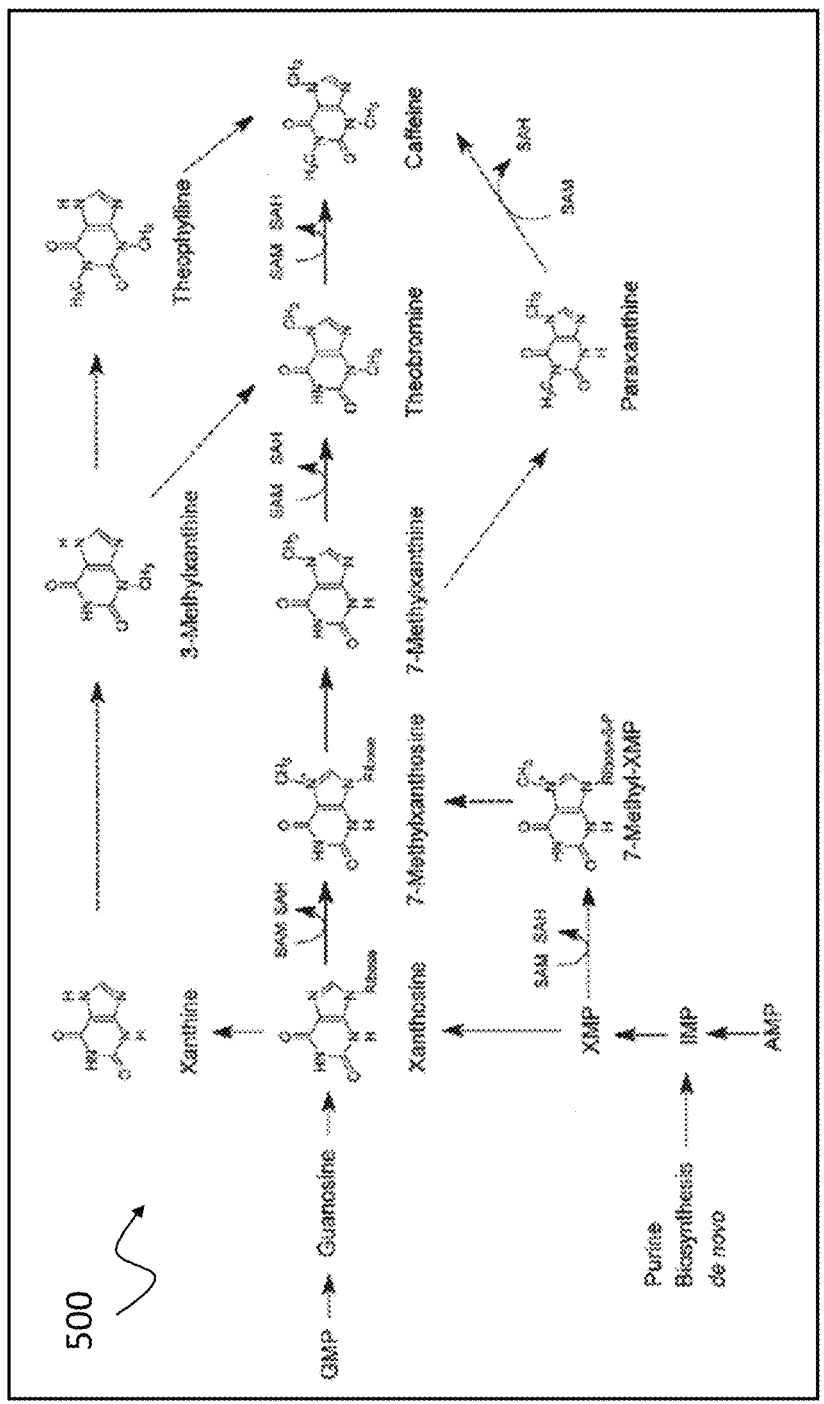
FIG. 5 shows a reaction schematic representing the biosynthetic pathway in plants producing caffeine either from GMP (Guanosine 5'-monophosphate) or an alternative purine biosynthetic pathway de novo.

FIG. 5 shows the biosynthetic pathway (500) in plants producing caffeine either from a GMP (Guanosine 5'-monophosphate) or the alternative purine biosynthetic pathway de novo. Accordingly, various caffeine-related chemical compounds (congeners) are also present in coffee and tea, and are present in these brewed beverages, including guanosine, xanthine, 3-methylxanthine, 3,7-dimethyl xanthine, theophylline, 7-methylxanthosine, 7-methylxanthine, theobromine, and paraxanthine in addition to caffeine, which is generally present in the highest quantity or concentration. Nevertheless, some of these other materials and others present provide the beverages with their characteristic flavors, odors and taste, as well as color. Thus, one aspect of the present invention is a 3-D MIP matrix that has high selectivity toward caffeine as the target imprinted entity (TIE) or template molecule, meaning that the extent of other, even similarly related or structurally similar chemical components being absorbed or taken-up by the MIP matrix is correspondingly lower or even negligible, so that the sensory nature of the caffeine-extracted beverage is not changed significantly, or if it is altered, not changed in a manner perceived as being undesirable to a consumer or user desiring to decaffeinate a beverage immediately prior to ingestion.

In addition to the selection of monomers, their relative ratio and reaction conditions, the post-treatment of the 3-D MIP matrix, when rendered into the form of particles, beads, fibers or foams, can have surprising effects of the overall behaviors of the MIP polymer.

Calculated Parameters

Discussions of performance and comparison of MIP matrices is enabled by the measurement of some basic chemical equilibrium and thermodynamic parameters such as $Q_{max}$ introduced above. The Langmuir Equation defines the relationship between this parameter and the equilibrium concentrations and rates in Formula 1:

$$Q_{eq}=Q_{max}*[K_c*C_{eq}/(1+K_c*C_{eq})] \qquad (1)$$

wherein $Q_{eq}$ is the equilibrium binding constant for a species having an equilibrium concentration of $C_{eq}$ and an absorption rate constant of $K_c$, where $Q_{max}$ represents the maximum capacity of absorbance of a MIP in units of mg/g, being milligrams of absorbate per grams of polymer. At any given time, $Q_{eq}$ and $C_{eq}$ are related to the Fraction of Caffeine Removal (F), as follows:

$$Q_{eq}=f_r*W_{(mg,Caffeine)}/G_{pp} \qquad (2)$$

$$C_{eq}=(1-f_r)*W_{(mg,Caffeine)}\times 0.0001/194.2*L_{bev} \qquad (3)$$

where $f_r$ is the fraction of caffeine removed from beverage, a scalar number, W is the weight, in milligrams, of caffeine initially present in the beverage, $G_{pp}$ is the total gram of MIP present, $L_{bev}$ is the volume of the beverage in liters, typically being expressed in ounces or milliliters, and 194.2 is the molecular weight of caffeine, in units of grams/mole.

Substituting $Q_{eq}$ and $C_{eq}$ with the equations in terms of $f_r$, provides:

$$f_r*W/G_{pp} = Q_{max} * \frac{[K_c*(1-f_r)*0.001*W/(194.2*L_{bev})]}{1+[K_c*(1-f_r)*0.001*W/(194.2*L_{bev})]} \qquad (4)$$

The equation can be solved using a quadratic approach, but it is easier to solve using an optimization routine starting with some approximate seed values for the variable quantities or those desired to be optimized. However, one limitation of this approach is that it is based on equilibrium conditions, and so does not account for differences in polymer structure that account for the surprisingly enhanced non-equilibrium properties of MIPS formed using the inventive methods disclosed herein, including increases in the initial or instantaneous binding or uptake rate of caffeine, and enhanced selectivity of absorbance of the target molecule, caffeine. These two factors are generally averaged out when an equilibrium measurement is performed, or a measurement made at a sufficiently long enough time period for the system to reach a near-equilibrium or equilibrium state at which point the uptake of the caffeine slows significantly, typically in the order of 1 minute or more. In other words, it is believed that subtle improvements in the MIP matrix are accountable for the ability of the inventive MIPs disclosed herein to act differently, with significantly improved rapidly in absorbing caffeine in very short contact times, making the use of these inventive MIP systems practical for commercial usage where the time to achieve the desired degree of decaffeination of a beverage is within a one minute period, consumers generally not being patient or willing enough to invest greater time in the process. In contrast, with sufficient time exceeding the practical timeframe of minutes, the present inventive MIPS also reach an equilibrium condition comparable to previously prepared MIPS and would otherwise appear to behave similarly, if only equilibrium behaviors were to be compared. Accordingly, without being bound by theory, it is believed that the present means of producing the MIP matrices as disclosed herein, using higher crosslinking ratios and higher relative amounts of template material, combined with some advantageous post processing treatments including particle size selection and the degree of initial matrix hydration, produces a resulting MIP matrix that has a faster initial update rate combined with a higher uptake capacity that does not negatively impact the desired specificity of action, i.e. the ability of the inventive matrices to quickly and selectively absorb caffeine from an aqueous beverage.

Polymer Synthesis

The two primary monomers used in the synthesis of the example copolymers of the present invention are divinylbenzene (DVB) and methacrylic acid (MAA), using a suitable free radical initiator as a crosslinking agent such as, for example but not limited to, azo-bis-isobutyronitrile (AIBN). In general, either a homobifunctional or heterobifunctional crosslinker can be employed herein. Homobifunctional crosslinkers are those having identical reactive groups at either end of a spacer arm. Generally, they must be used in one-step reaction procedures to randomly "fix" or polymerize molecules containing like functional groups. In contrast, heterobifunctional crosslinkers possess different reactive groups at either end. These reagents not only allow for single-step conjugation of molecules that have the respective target functional group, but they also allow for sequential (two-step) conjugations that minimize undesirable polymerization or self-conjugation. Other crosslinking agents include, but are not limited to N-5-azido-2-nitrobenzoyloxysuccinimide (ANB-NOS), 1-ethyl-3-(3-dimethylaminopropyl)carbodiimide hydrochloride (EDC), N-hydroxysuccinimide (NHS), para-methyl styrene, butyl acrylate, butyl methacrylate, diallyl phthalate (DAP), 1,3-butanediol dimethylacrylate (BDMA), diallyl isophthalate (DAIP), octyl acrylamide, trimethylol propane triacrylate (particularly for UV beam curing), triallyl cyanurate (TAC), triallyl isocyanurate and diallyl maleate.

Because of its para or opposed divinyl functionalities, the DVB monomer also can act as a crosslinking agent as disclosed hereinabove, serving to bridge two proximate linear copolymer strands when its para oriented vinyl moieties becomes polymerized into the respective proximate linear regions during the polymerization process. Further, in additional embodiments, the addition of different monomers can also be employed to produce a terpolymer or even higher level multimers in further embodiments using an additional third or fourth monomer. In these higher order multimers, selection of an appropriate monomer can be made from those materials known in the art, and which can provide, following the polymerization process, a new polymeric segment of the resulting MIP having additional properties including, aromaticity, alkalinity or acidity, a unit net negative or positive charge, an amphoteric charge, a hydrophilic or hydrophobic property, an ionic binding site, and combinations thereof.

For the synthesis of the inventive copolymers, divinylbenzene, technical grade (80%) was obtained from the Sigma-Aldrich Chemical Co., (now MilliporeSigma, 400 Summit Drive, Burlington, Mass. 01803, USA), and passed over an activated alumina oxide basic column to remove impurities and the trace amount (1000 ppm) of p-tert-butylcatechol present as purchased and added as an inhibitor.

Methacrylic acid, 99%, was obtained from the Acros Organics Co., (subsidiary of Fisher Scientific USA, 2000 Park Lane Drive, Pittsburgh, Pa., USA) and was purified by distillation under reduced pressure to remove the approximately 100 ppm MEHQ (mono methyl ether of hydroquinone) inhibitor present. AIBN, (2,2'-azobis-2-methylpropionitrile), 98%, was obtained from MilliporeSigma and was recrystallized once from methanol (ACS Grade, American Chemical Society) to remove color. For imprinting purposes, caffeine, 99.7%, was obtained from Alfa Aesar (a subsidiary of Thermo Fisher Scientific, 2 Radcliff Rd., Tewksbury, Mass. 01876, USA).

Copolymers having a molar ratio of DVB to MAA between (70:30 to 95:5) where synthesized and measured, the experimental data revealed that higher DVB ratios produced MIP matrices exhibiting both higher relative adsorption capacity and improved relative caffeine selectivity, with the resulting 85:15 DVB:MAA copolymer matrix having the highest measured capacities. The qualifier "relative" is used immediately herein above because the absolute numbers for adsorption and selectivity are affected by a variety of factors and the 85:15 DVB:MAA may not be the preferred ratio under all usage conditions, with ratios of between 80:20 and 95:5 DVB:MAA also be acceptable for the purposes of the present invention.

In one experimental embodiment, a DVB:MMA copolymer matrix was produced by copolymerization of DVB with MMA at a selected ratio (85:15 molar ratio) following the experimental procedure detailed here. DVB (36 ml, 32.9 g or the equivalent to approximately 0.25 moles), was combined with MAA (3.8 ml, 3.86 g, or the equivalent to approximately 0.045 mole) and AIBN (1.4 g, 0.009 mole) in a solution consisting of acetonitrile (23 ml) and caffeine (1.7 g, or the equivalent to approximately 0.009 mole) were mixed together in 150 ml Erlenmeyer flask and stirred with magnetic stir bar to get a clear solution free of undissolved solids. Obtained solution was transferred into plastic centrifuge tubes (50 ml) that were closed with a rubber septum and degassed with nitrogen for 10 minutes, then placed in an oil bath preheated to 49° C., without further stirring or agitation. Polymerization was carried out for 24 hrs. at a controlled bath temperature of 49° C.). After cooling, solvent was decanted away and the remaining crude polymer was washed with methanol (about 10 ml volume) and then dried under reduced pressure at room temperature for about 0.5 hr. until dry by appearance, isolated in the form of a solid plug of material.

Fabrication of MIP Particles

In order to render the resulting MIP polymer material into a more usable physical form, the resulting polymer from above was crushed inside the tube by hammering it with a rounded end metal rod. At larger scales, a ball mill or other similar device for reducing particle size can be employed, the process repeated until the bulk of the resulting MIP polymer is present in the particle size range or size distribution desired. Following preparation according to the above embodiment, the crushed material was removed from the tube, divided into several smaller aliquots and then grinded manually using a pestle and mortar. The completion of grinding process was manifested by uniform (without visible large particles) appearance of the powder as well as smoothness of driving of the pestle through the mortar surface indicating the absence of larger particles of the crushed polymeric product. In other embodiments, a ball mill was employed rather than manual reduction of the polymerized mass to powder. For those preparations, an all direction planetary ball mill (model series XBM4X available from Columbia International, 104 Ballentine Park Road, Irmo, South Carolina, 29063, U.S.A.) was used at 45 rpm with about a 6 mm ball size, in three cycles of 5 mins for a total of 15 min grinding time to prevent overheating of the sample. Under both methods, the resulting MIP polymer obtained following synthesis was reduced to a fine, white powder having an average particle size of less than about 20 um (microns), as determined by screening through a series of meshes until the material was substantially retained on a final screen of that approximate mesh spacing.

Purification of MIP Particles

Finely ground MIP polymer resulting from the above fabrication process step had the appearance of a white powder, and was then placed in a 500 ml Erlenmeyer flask and mixed with a 5 wt % solution of acetic acid in methanol (150 ml), stirred for 10 minutes while the mixture was heated to between 55-60° C. The hot mixture was filtered using standard filter paper and funnel apparatus, and the fine polymer powder was then washed with an additional 100 ml aliquot of the acidified methanol solution while still retained on the filtering apparatus. The polymer powder was transferred one additional time to a flask containing neat heated methanol (150 ml) and stirred for 10 minutes, then filtered and washed with a final neat 100 ml volume of methanol, followed by removal of the powder from the filter paper, followed by a final drying step in which the powder was then dried under vacuum at room temperature for about 2 hours, after which a fine, dry, white, easy flowing polymer powder was obtained.

Figure 2:
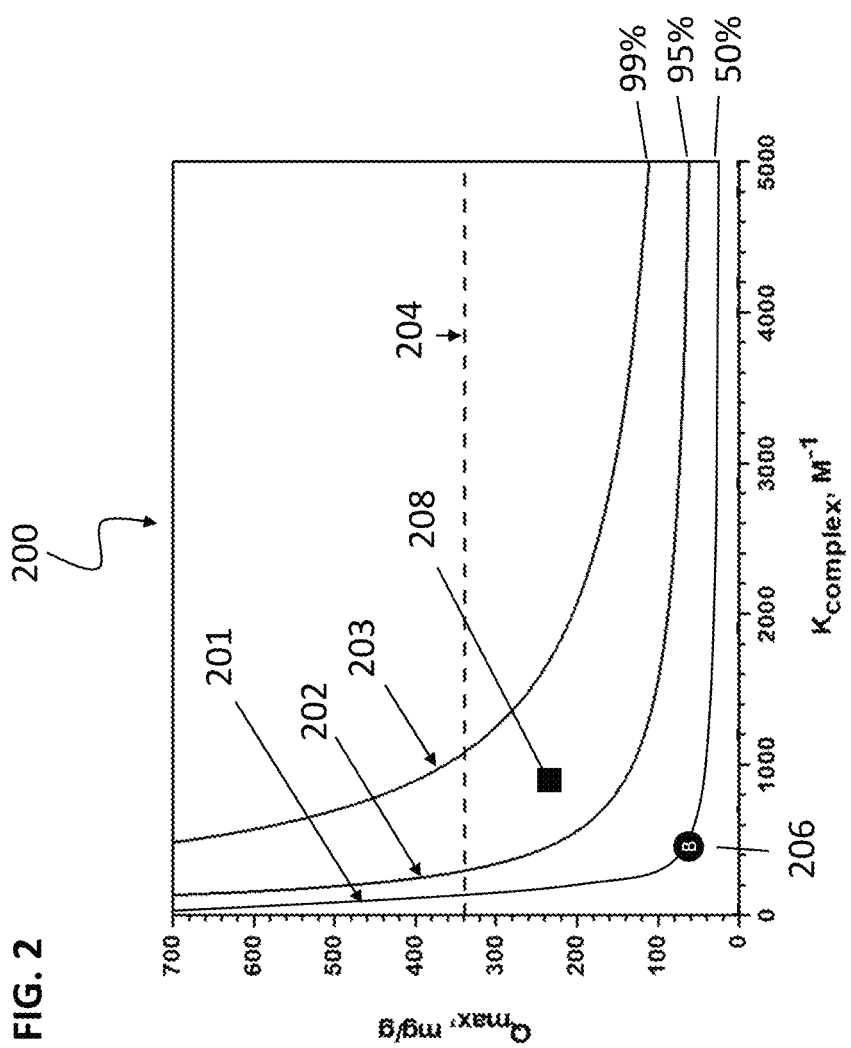
FIG. 2 shows an XY graph comparing the measured parameters corresponding to $Q_{max}$ vs. $k_{complex}$ for a selection of MIP examples.

The thermodynamic properties of a series of embodiments of the inventive MIP matrices was conducted after synthetic preparation by rendering them into a fine particulate form and conducting measurements to determine the rate of absorption $K_c$ of the TIE material, here being caffeine, as well as the equilibrium $Q_{max}$ capacity of the resulting MIP particles. A model system representing a typical caffeinated beverage, a regularly brewed cup of coffee containing approximately 240 mg of caffeine per 250 ml volume was selected, using a self-buffered (pH 5-7) solution of caffeine at that same relative concentration dissolved into purified (de-ionized) water, and also replicated on actual brewed coffee solutions having approximately the same caffeine level present. FIG. 2 is a plot 200 of $Q_{max}$ versus $K_c$, in the indicated units, with trace 201 representing the theoretical yield threshold of 50% relative absorption (removal of caffeine), trace 202 representing a yield threshold of 90% and trace 203 representing a yield threshold of 95%, the yield increasing from the left to right side of each trace, each thus representing the lower minimum of the respective threshold value as indicated on the graph. The dotted trace 204 represents an optimal $Q_{max}$ threshold based on the calculations shown above that would be desired to achieve high caffeine reduction (enhanced absorption) of a caffeinated beverage at the indicated theoretical yield thresholds shown, which shows that higher $K_c$ values, on the order of one magnitude (10×) increase, being required to drive the theoretical yield value from 50 to 95% removal.

Comparative MIP samples produced using the method of Villamena (*Caffeine Selectivity of Divinylbenzene Crosslinked Polymers in Aqueous Media*, National Exposure Research Laboratory, U.S. Environmental Protection Agency, 26 West Martin Luther King Drive, Cincinnati, Ohio 45268, 22 Dec. 2000) show equilibrium kinetic behaviors as represented by Comparative Example B, see as point 206 on the plot 200 of FIG. 2, which exhibits a reported caffeine extraction of 50.2%. In contrast, embodiments of the present invention, MIP matrices prepared as discussed below to introduce hyper-crosslinking and higher molar TIE to polymer ratios, are found to exhibit significantly enhanced caffeine reduction (caffeine absorption) by significantly improving $Q_{max}$ without necessarily having to dramatically increase the values of $K_c$ of the MIP materials. Indeed, here, embodiments of the present invention illustrated by Sample No. 21 exhibits about 94% relative caffeine reduction, corresponding to the solid square 208 plotted in FIG. 2.

MIP Matrix Prehydration

Testing of the resulting MIP powder matrices was conducted, during which it was discovered that the dried polymer beads and particles had slow initial wettability, requiring some time for penetration of water and beverages in bulk to wet the surface of the powder, and somewhat longer times for the complete wetting of a quantity of the powder when present in a contained manner, such as within a mesh bag, that otherwise enabled the flow and exchange of a liquid with the powdered MIP material. Measurement of longer term, equilibrium conditions did show some notably differences in performance for most parameters, for example, the level of extraction as well as the fundamental kinetic and equilibrium parameters, $Q_{max}$ and $K_{eq}$. This is unanticipated owing to the belief that over a 12 hour exposure time that equilibrium conditions would have been achieved and any impact on performance due to an initial delay in wetting would be inconsequential. Results showed otherwise even under the long equilibrium times, so repeated measurement of shorter term, non-equilibrium initial absorption rates and levels of extraction over shorter periods of time less than about five (5) minutes were then performed, and results confirmed even more significant variations depending on the degree of hydration of the MIP matrices under shorter exposure times.

In one preliminary test, identical samples of an inventive MIP copolymer of 85:25 DVB:MMA was prepared with a higher template (caffeine) ratio and the equilibrium efficacy of the resulting MIP matrixes were measured after extraction of the caffeine TIE, followed either by complete drying or allowing the MIP matrix to remain slightly moist from the final water rinsing step. Results revealed that a completely dry 85:25 DVB:MMA MIP matrix (with a T:P of 2.0) exhibited a $Q_{max}$ of 96.2 mg/g and a $K_{eq}$ of 263 $M^{-1}$, while the moist version exhibited a $Q_{max}$ of 144.7 mg/g and a $K_{eq}$ of 673 $M^{-1}$, confirming that a moistened MIP matrix exhibits more favorable kinetics in turns of a higher $Q_{max}$ as well as reaching an equilibrium binding state at least by a factor of two faster than the thoroughly dry, but otherwise identical, MIP matrix.

Tests were conducted to determine the degree to which the MIP could be pre-wetted with water or aqueous solutions, the extent of water pickup or hydration, and means to adjust and/or select the initial degree of hydration (hydration factor) to produce a beneficial change in performance by the modified MIP powder matrices to decaffeinate an aqueous beverage. Dried polymer powder from one or more of the beforementioned embodiments was wetted with water using the following procedure. After the purification of the polymer particles as described above, the polymer was divided and transferred to 50 ml plastic centrifuge tubes (about 10 g of the polymer per tube). Next, neat methanol (40 ml) was added to the tube and the mixture was shaken manually for about 1 min. Then, the tube was destoppered and a vacuum applied to the top until an abrupt bubbling indicated the onset of boiling of the methanol and degassing of the solvent. The five centrifuge tubes were then placed into a centrifuge (Durafuge Model #100 by Precision, 170 Marcel Drive, Winchester, Va. 22602, USA) and centrifuged at 5,000 rpm (revolutions per minute) for 3 min. The bulk of the methanol was decanted, and then most of the remainder removed by pipette, followed by rinsing and removal of deionized water (using about 50 ml of volume). Finally, additional deionized water was introduced and the mixture shaken for 5 min at the lowest agitation setting using a Mistral Multi-Mixer (Lab-Line Instruments Inc., 15th Bloomingdale Ave., Melrose Park Ill., 60160 USA). The same abovementioned (methanol wetting, centrifugation and decanting) routine was repeated, for a total of four complete cycles being performed, after which the hydrated polymer particles were stored in tightly closed 50 ml centrifuge tubes for further testing and evaluation.

Free moisture levels in example MIP matrix embodiments of the present invention were determined by several approaches, including determination of weight loss following extensive and prolonged drying of samples at room temperature, and more formalized testing using the ASTM (American Section of the International Association for Testing Materials) method D2216-05 that determines the amount of free moisture present as a percentage of weight. Measurements using this method were validated and conducted by MacCampbell Analytical, Inc., 1534 Willow Pass Road, Pittsburgh, Calif., USA.

Test results indicate that initial wetting or prehydration of the polymer powder resulted in a significant change in character denoted by a positive increase in performance, both in terms of the initial caffeine uptake or absorbance rate of the target caffeine from a solution, as well as an increase in the overall quantitative degree of absorption or capacity of the MIP matrices of the present invention.

In another series of tests, it was also determined that the initial production of the inventive MIP matrices produced material having about 50 wt. % hydration owing to the water purification step, so in a second set of studies, a series of otherwise identical aliquots of the inventive MIP matrices, in the form of a fine powder, were successively dried by heating the already water saturated polymer beads so as to reduce the extent of water remaining present to 50%, 30%, 10%, 5% and 1% moisture content. As water content (degree of hydration) of the MIP matrix materials (in the form of a coarse powder) increased, the polymer's appearance changed slightly from a clear, crystalline-like appearance to a slightly white and milky appearance, and the materials retained there free-flowing behavior up to about the 50 wt. % hydration level, at which point representative embodiments started to become slightly 'sticky' or cohesive in behavior, exhibited as a slight tendency of the powder forms to clump together.

No significant performance differences were noted between example inventive MIP polymers produced from initially hydrated samples that were reduced to a fixed common hydration level by drying versus similarly prepared, but previously dried MIP polymers that were later re-hydrated by exposure to water in a second step after the initial isolation, purification and drying steps performed as described hereinabove. Accordingly, embodiments of the present invention utilizing hydrated MIPs that are useful include both pre- and post-hydrated MIP matrices. Without being bound by theory, it is believed that those MIP matrices with higher hydration levels generally exhibit improved wetting speeds, an advantageous property when employed for decaffeination of a beverage within a short time period, as the initial contact of the MIP particles with the beverage is apparently aided by moisture within the particle pores and channels providing faster permeation and contact of the beverage with the interstitial pores and channels within the MIPs.

In some of the inventive embodiments, the hydrated MIP matrices having improved caffeine uptake within a 1 minute exposure period had relative water levels of between 1% to 75 wt. %, while in other embodiments, enhanced performance, believed to be due to the initial improvement in wettability facilitating faster initial coupling of the MIP matrices with the surrounding aqueous beverage were observed for inventive MIP polymers with between 5 to 50 wt. % moisture. Accordingly, the pre-hydrated MIP polymers of the present invention may have between 1 to 75 wt % water present, or alternatively between 5 to 50 wt. % water present, or yet alternatively between 10 to 50 wt. % water present.

Programmable Polymer Performance

To assist in determining optimum DVB/MAA ratios and reaction conditions, a series of microscale polymer preparations were conducted to produce small quantities of the inventive MIP matrix materials sufficient for testing, e.g. sufficient in size to enable quantification of the degree of extraction efficacy with regard to caffeine, and also the degree of selectivity, or the selectivity factor, as defined herein.

Table 1 shows the composition and performance attributes of a series of DVB/MMA copolymers, including two comparative samples, Example A and Example B, representing a non-MIP polymer prepared without a template molecule and a MIP polymer prepared in a manner according to previously disclosure in the art, respectively.

TABLE 1

| Sample No. | DVB (ml) (2) | MAA (ml) (3) | Molar Ratio (4) | Solvent ACN (ml) | Caffeine (g) (5) | Template Ratio Factor (T:P) (6) | AIBN (g) (7) | Cross-linker Ratio (P:C) (8) | Temp (° C.) (9) | Extraction (%) (10) | Selectivity Factor (11) |
|---|---|---|---|---|---|---|---|---|---|---|---|
| A(1) | 6.0 | 0.63 | 85:15 | 3.9 | — | — | 0.12 | — | 59 | 63.8 | 1.55 |
| B(1) | 6.0 | 0.63 | 85:15 | 3.9 | 0.28 | 1.0 | 0.12 | 55.3 | 59 | 50.2 | 1.88 |
| C | 6.0 | 0.89 | 80:20 | 4.13 | — | 0 | 0.12 | — | 59 | 54 | 1.46 |
| D | 6.0 | 1.19 | 75:25 | 4.3 | — | 0 | 0.12 | — | 59 | 42.6 | 1.79 |

TABLE 1-continued

| Sample No. | DVB (ml) (2) | MAA (ml) (3) | Molar Ratio (4) | Solvent ACN (ml) | Caffeine (g) (5) | Template Ratio Factor (T:P) (6) | AIBN (g) (7) | Cross-linker Ratio (P:C) (8) | Temp (° C.) (9) | Ex-traction (%) (10) | Selectivity Factor (11) |
|---|---|---|---|---|---|---|---|---|---|---|---|
| E | 6.0 | 1.53 | 70:30 | 4.53 | — | 0 | 0.12 | — | 59 | 34.7 | 1.79 |
| 1 | 6.0 | 0.29 | 95:05 | 4.0 | 0.30 | 1.0 | 0.075 | 83.9 | 59 | — | — |
| 2 | 6.0 | 0.59 | 90:10 | 3.8 | 0.30 | 1.0 | 0.077 | 83.1 | 59 | — | — |
| 3 | 6.0 | 0.89 | 80:20 | 4.1 | 0.30 | 1.03 | 0.12 | 57.4 | 59 | 47 | 1.72 |
| 4 | 6.0 | 1.19 | 75:25 | 4.3 | 0.31 | 1.02 | 0.12 | 59.9 | 59 | 47 | 1.71 |
| 5 | 6.0 | 1.53 | 70:30 | 4.5 | 0.32 | 1.01 | 0.12 | 62.8 | 59 | 48.1 | 1.70 |
| 6 | 6.0 | 0.63 | 85:15 | 3.9 | 0.28 | 1.0 | 0.077 | 86.1 | 50 | 51 | 1.90 |
| 7 | 6.0 | 0.63 | 85:15 | 3.9 | 0.42 | 1.50 | 0.077 | 86.1 | 50 | 69.8 | 1.70 |
| 8 | 6.0 | 0.63 | 85:15 | 3.9 | 0.56 | 2.0 | 0.077 | 86.1 | 50 | 73.4 | 1.70 |
| 9 | 6.0 | 0.63 | 85:15 | 3.9 | 0.84 | 3.0 | 0.1 | 66.3 | 51 | 68.7 | 1.87 |
| 10 | 6.0 | 0.63 | 85:15 | 4.4 | 1.12 | 4.0 | 0.1 | 66.3 | 52 | 77.7 | 1.77 |
| 11 | 6.0 | 0.63 | 85:15 | 3.9 | 0.28 | 1.0 | 0.12 | 55.3 | 50 | 68.3 | 1.87 |
| 12 | 6.0 | 0.63 | 85:15 | 3.9 | 0.28 | 1.0 | 0.24 | 27.6 | 52 | 67 | 1.93 |
| 13 | 15.3 | 1.6 | 85:15 | 11 | 2.85 | 4.0 | 0.25 | 67.6 | 49 | 67.4 | 1.74 |
| 14 | 18 | 1.9 | 85:15 | 11.7 | 0.84 | 1.0 | 0.72 | 27.6 | 49 | 66.8 | 1.85 |
| 15 | 36 | 3.8 | 85:15 | 23 | 1.7 | 1.0 | 1.4 | 28.4 | 49 | 67 | 1.87 |
| 16 | 36 | 3.8 | 85:15 | 23 | 1.7 | 1.0 | 1.4 | 28.4 | 49 | 67.8 | 1.97 |
| 17 | 36 | 3.8 | 85:15 | 23 | 1.7 | 1.0 | 1.4 | 28.4 | 49 | 67.5 | 1.88 |
| 18 | 36 | 3.8 | 85:15 | 23 | 1.7 | 1.0 | 1.4 | 28.4 | 49 | 60.9 | 2.00 |
| 19 | 36 | 3.8 | 85:15 | 23 | 1.7 | 1.0 | 1.4 | 28.4 | 49 | 68.0 | 1.96 |
| 20 | 36 | 3.8 | 85:15 | 23 | 1.7 | 4.27 | 1.4 | 28.4 | 49 | 74.8 | 1.92 |
| 21 | 36 | 3.8 | 85:15 | 23 | 1.7 | 4.27 | 1.4 | 28.4 | 49 | 94 | 5.5 |
| 22 | 6.0 | 0.63 | 85:15 | 3.9 | 0.28 | 4.22 | 0.12 | 55.3 | 59 | 95 | 1.9 |

(1) Prepared using method disclosed by Villamena (see reference)
(2) Divinyl benzene monomer
(3) Methylmethacrylate monomer
(4) Molar ratio of DVB:MMA based on initial monomer molar ratios.
(5) Solvent, reagent grade (95% purity)
(6) Template ratio factor (T:P) is defined as the ratio of number of moles of template material to total moles of co-polymer materials use.
(7) Crosslinker, azo-bis-isobutyronitrile (AIBN)
(8) Crosslinker Ratio (P:C) is defined as the ratio of weight of polymer components versus the weight of crosslinker material used.
(9) Maximum reaction temperature during polymerization
(10) Extraction percentage based on theoretical 100% removal
(11) Selectivity factor is defined as ratio of extracted caffeine to captured chlorogenic acid for comparative Examples A and B, and as ratio of extracted caffeine to captured 3,7-dimethyl xanthine for other samples.

TIE Imprinting Levels

In the various embodiments of the inventive MIP matrices synthesized and measured herein, it has been found that the concentration of the TIE during the synthesis is a critical parameter and that substantially higher molar excesses, rather than being detrimental to the resulting performance owing to solubilization concerns, in fact result in increased caffeine absorption. In one embodiment, synthesis of a MIP matrix of 85:15 DVB:MMA at a level of 4 times (4:1) higher than the singular molar ratio (1:1), results in a matrix that exhibits increased caffeine adsorption by as much as between 10% to 20% increased uptake. Interestingly, selectivity does not appear to be affected significantly, if at all, with higher TIE imprint levels. Higher than single molar levels had not been contemplated previously, because such aromatics as caffeine are known to form associated complexes, such as dimers in solution through the association of the out-of-plane pi aromatic bonds, resulting in non-optimal formation of binding sites as the resulting sites were believed to become optimized to receive the associated TIE, being larger in size and hence displacement, rather than the intended single caffeine moiety, as present at lower concentrations and in more aqueous solutions where it is more soluble owing to its being in solution equilibrium with its acidic, or deprotonated form. Without being bound by theory, these results suggests that the inventive polymers produced herein by means of employing a TIE at higher than single molar ratios tends to open up the structure of the MIP matrix, rather than necessarily to create more selective caffeine sites inside the polymer matrix. It is speculated that in these present embodiments, that the molar excess of caffeine may be acting partly as a porogen along with being the host molecule or TIE, forming association complexes that result in imprinted binding sites that still exhibit specificity for the caffeine moiety, but which are believed to be larger in size, aiding in the initial rapidity of absorbance as well as in the increased absorbance capacity of those sites, which may have multiple caffeine receptive regions present per site, yet are more open to solvent and water penetration and exchange owing to the larger sizes of the associatively complexed TIE molecules.

Inventive embodiments, Example No.s 7, 8, 9, & 10 were prepared using approximately 1.5, 2, 3.2, and 4.0 times higher templating material (TIE) than a 1:1 molar template ratio (T:P) respectively, as represented by Comparative Example B, the template ratio (T:P) being the number of moles of the imprint molecule (TIE or caffeine) present divided by the total moles of polymer components (monomers) used. The degree of removal of the resulting MIP matrices was observed to correspondingly increase from about 50% (Example B) to between 69.8%, 73.4%, 68.7 and 77.7% removal for Example No.s 7, 8, 9 & 10 spanning a T:P ratio range of between 1.5:1 to 4:1, a dramatically enhanced uptake efficacy as a result of employing a higher template molar ratio. To determine whether the increased uptake or removal levels caused any detrimental effect on performance, the resulting MIPs were also evaluated for their selectivity, or ability to absorb caffeine compared to one of the other caffeine-beverage containing moieties present that is believed to influence the perceived taste and aroma of brewed coffee. For the same set of example embodiments, 7-10, the selectivity, as determined by the ratio of the levels of extracted or absorbed caffeine to that of 3,7-dimethyl xanthine, was found to remain relatively unchanged despite a significant improvement in measured selectivity performance values, with measured values of selectivity ranging from 1.7 for Example No. 7 to selectivity factors of 1.7, 1.87 and 1.77 for Example No.s 8, 9 & 10, respectively. Accordingly, one means to produce MIP polymers with higher binding efficacies without significantly impacting the desired selectivity, is to dramatically increase the level of TIE employed during the synthetic preparation of the inventive MIP matrixes as disclosed herein.

In light of these findings, improved MIP matrices are optimally prepared by a synthetic route employing higher than a 1:1 molar (T:P) ratio of template:polymer, employing between a 1.5:1 to 4:1 molar ratio, or alternatively between a 2:1 to 4:1 molar ratio, or yet alternatively between a 3:1 to 4:1 molar ratio, or alternatively employing a 4:1 molar ratio during preparation of the MIP matrices, to improve the overall uptake characteristics of the resulting MIP matrices with respect to the selected TIE, here caffeine.

Capacity Levels

Further testing was conducted to determine the capacity, being the physical amount or weight of the inventive MIP matrices required to achieve significant reductions in caffeine levels in typical beverages, such as a normally brewed cup of coffee. Measurements were carried out using gram weight aliquots of the inventive MIP materials per 250 ml. of a test solution containing a coffee-cup equivalent of solubilized caffeine, or about 250 mg.

For most of the inventive MIP embodiments tested, a quantity of around 3.5 grams or higher was required to achieve 50% or greater caffeine removal at high selectivity within a 1 min. time frame, from a model caffeine beverage containing 240 mg of caffeine in a aqueous solution. It was noted that capacity did not vary significantly between room temperature and hot (approximately 150° F.) extraction events, the percentage of extraction and capacity levels appearing to be fairly independent of the temperature with pre-hydrated MIP matrices. Greater variations were observed with initially dry MIP matrices, which is believed due to slight differences in wetting speed when the MIP particles are immersed in a colder vs warmer aqueous liquid, the latter having greater energy in the form of faster moving water molecules, which without being bound by theory, may speed the initial wetting of dry or drier MIP matrices. However, the temperature effect is likely diminished at higher temperatures in pre-hydrated MIP matrices as the water of hydration present already provides sufficient wetting to couple the inventive MIP particles to the aqueous solution.

With respect to capacity, although smaller quantities are effective at higher removal values as well, they require greater than one minute contact time, which for the purposes of the present invention, represent a reasonable upper limit for time exposure for a MIP matrix and method of decaffeination of a beverage within a consumer-relevant timeframe for the treatment of a single beverage immediately prior to consumption. Accordingly, on a scaled basis using a 240 mg caffeine containing aqueous solution as a standard control with a volume of approximately 250 ml, embodiments of the present invention employing the MIP matrices require between 3.0 g to about 5.0 g to achieve greater than 70% removal of the caffeine, or alternatively between 3.5 g to about 4.5 g, on a dry or non-hydrated weight basis of the inventive MIP polymer.

Figure 4:
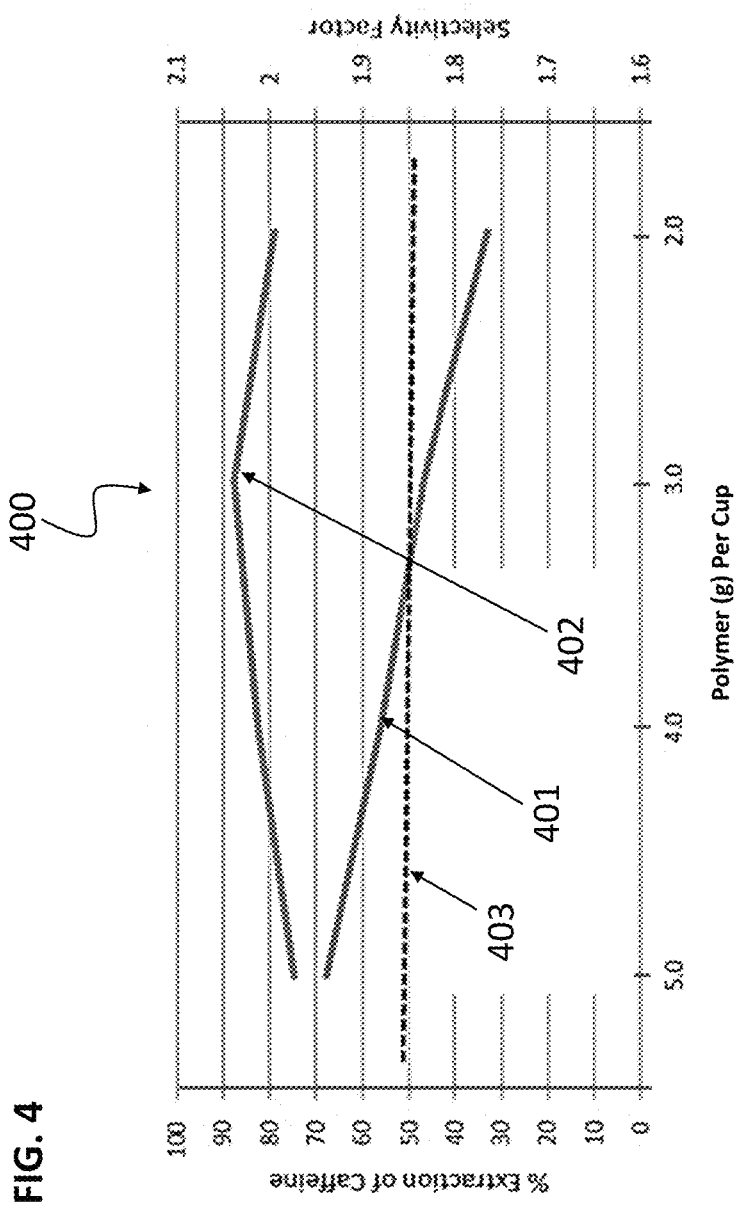
FIG. 4 shows an XY graph comparing the measured parameters corresponding to the Extraction Level (% Extraction) vs. Polymer Weight for caffeine for a selection of MIP examples.

FIG. 4 shows a dual plot 400 of the relative percent of caffeine extraction (% Extraction) versus the gram weight of inventive MIP polymer in the form of finely ground particles, represented by trace 402, and a plot of the Selectivity Factor towards caffeine vs the gram weight of MIP polymer, represented by trace 401, the dotted line 403 representing the theoretical yield threshold of 50% relative absorption (removal of caffeine) discussed above. As can be seen, larger amounts of polymer are more effective at removing greater amounts of caffeine under otherwise identical conditions, with a relatively linear behavior as the amount of polymer is increased from 2.0 g (on right side of plot) to 5.0 g (on left side of plot), nearly achieving a level of about 70% extraction of caffeine using 5.0 g MIP polymer per cup. However, it is seen the Selectivity factor tends to behave non-linearly, at least within the limits of statistical relevancy, as it is seen to be very high, approaching values between 2.0 to 2.05 at polymer weights of 2.0 g and 3.0 g/cup, respectively. However, with the use of greater amounts of polymer, the Selectivity Factor drops to below 2 as 4.0 g and 5.0 g/cup of polymer are used. Without being bound by theory, it is believed that the use of higher amounts of the inventive MIP matrices results in some loss of selectivity owing to the significantly greater number of TIE binding sites are provided (being proportional to the mass of polymer used), so that with higher amounts, other caffeine-like moieties (congeners) are more favorably competing for free caffeine (TIE) binding sites, as more of these are available at higher polymer weights when the amount of caffeine is fixed. Further, as solution levels of caffeine decrease, the relative molar ratio of the congeners with respect to caffeine tends to increase, providing them a binding advantage even though their own characteristic binding rates and affinity to the caffeine-TIE binding sites are considerably lower (less binding efficacy) than that of the caffeine TIE used in their formation. Accordingly, selection of the amount of inventive MIP matrix materials used is extremely critical in optimizing the amount of caffeine extraction without compromising the selectivity towards caffeine, as well as producing enhanced MIP materials according to the present invention having better $Q_{max}$ and $K_c$ values owing to the synthetic techniques disclosed herein that modify the behavior of the caffeine binding sites within the MIP materials.

Hyper-Crosslinking

Additional measurements were performed on the inventive MIP matrices produced using higher crosslinking (free radical initiator) ratios and also combined with higher template ratios to determine if there was any impact on the selectivity of the resulting MIP particles with respect to caffeine vs. other similar materials present known to contribute to perceive color, odor and taste. It was generally believed that when caffeine adsorption is high, selectivity goes down because the higher level of caffeine adsorption also means that all sites, those that have some preference for caffeine and those that do not have as much preference for caffeine are present in higher numbers and both caffeine and chlorogenic acid (one measure of selectivity) both have lots of sites to which they can bind, or in other words, that the binding of caffeine and other molecules is not rate limited by the reduction in available binding sites.

Accordingly, with traditional MIPs, a treated cup of coffee will show more loss in color and smell when high caffeine adsorption occurs (because lots of other components being taken out as well). Conversely if caffeine adsorption is low, than it is an indicator of fewer sites overall and chlorogenic acid and caffeine compete for fewer sites. In the analogy to above, this might be described as the case where the limited number of sites is now potentially rate limiting. To the extent that some sites might have a slight preference for caffeine, the difference between caffeine bound vs chlorogenic acid bound becomes more pronounced. In this case not only do caffeine and chlorogenic compete for some of the same sites but they also are competing for fewer sites and this becomes limiting. The above is also consistent with the observations on treated cups of coffee. Polymers that have higher caffeine adsorption also tend to lose more color and odor. Higher caffeine adsorption implies overall more binding sites and greater capacity for other molecules to be adsorbed.

However, when higher crosslinker levels are employed to produce the hyper-crosslinked MIP matrix embodiments of the present invention, selectivity is observed to increase significantly. Inventive embodiments, Example No.s 11 and 12, with P:C ratios of 55.3 and 27.6, exhibit a selectivity of 1.87 and 1.93, respectively, compared to a normal MIP produced with a lower degree of crosslinker present during the synthesis, Example No. 13 with a P:C weight ratio of 67.6 having a selectivity of 1.74. To determine whether increased TIE levels had any effect in combination with higher crosslinking, example embodiment Example No.s 9 and 10 with T:P ratios of 3.0 and 4.0, and P:C ratios of 66.3 was prepared and found to exhibit measured selectivity of 1.87 and 1.77, respectively, indicating that the optimization of polymer, TIE and crosslinker ratios with respect to overall absorption efficacy and selectivity are codependent variables requiring dual optimization in reproducing the inventive MIP matrices of the present invention obtained using higher TIE levels and synthesized with higher levels of crosslinker present. In general, when a crosslinker is employed, higher relative levels of the crosslinker are found to produce MIP matrices with slightly higher selectively.

Accordingly, improved MIP matrices according to the present invention may be formed using a polymer:crosslinker (P:C) weight ratio of between about 25:1 to about 90:1 or alternatively, between 25:1 to about 85:1, or alternatively, between 25:1 to about 75:1, or yet alternatively, between 30:1 to about 60:1.

Figure 3:
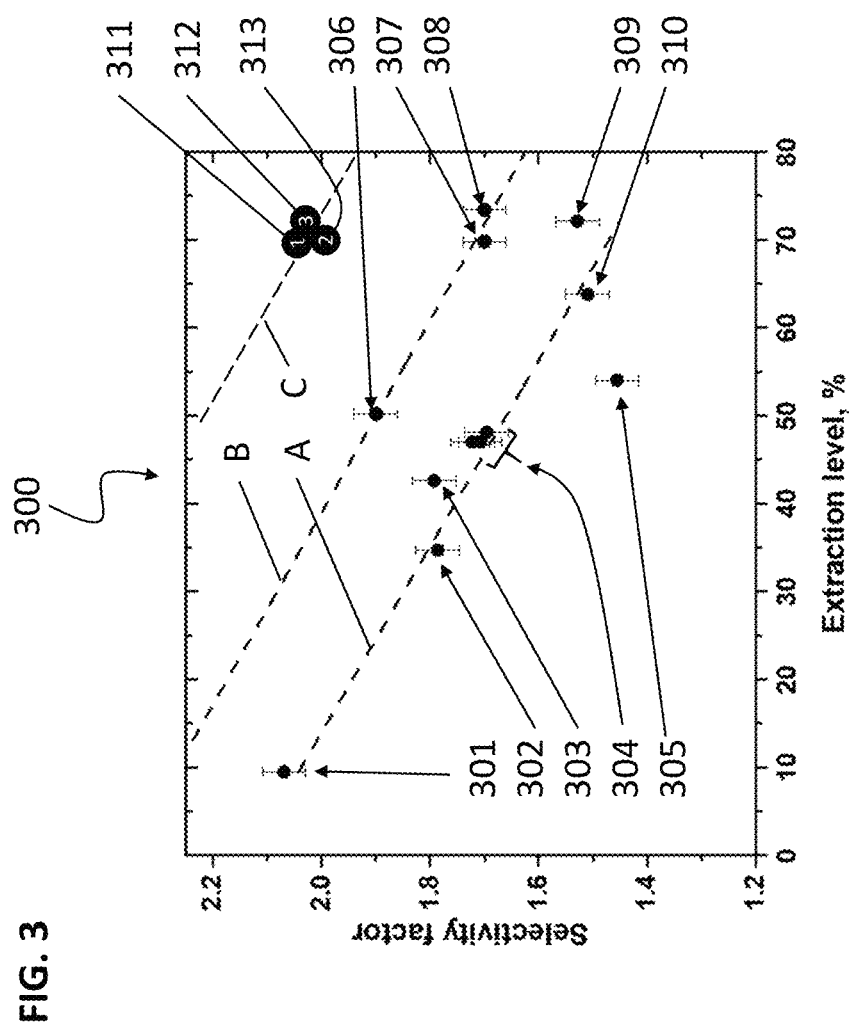
FIG. 3 shows an XY graph comparing the measured parameters corresponding to the Selectivity Factor vs. Extraction Level (% Extraction) for caffeine for a selection of MIP examples.

FIG. 3 shows a plot of the Selectivity factor versus percent caffeine extraction (% Extraction) of a series of some of the inventive caffeine imprinted MIP systems. Comparative examples indicated by data points 301-303, and 305-310 represent conventional NIPs (non-imprinted polymer) and MIPs (data points 304) produced with low template concentrations and with low amounts of crosslinker present, seen in FIG. 3 to mostly tend to follow the trend line A indicated, which is representative of the behaviors of low affinity native copolymer (NIP) matrixes formed without a template (TIE) molecule present, where high affinity for caffeine is countered by poor (low) selectivity with respect to caffeine. Owing to the partially hydrophobic and aromatic properties of caffeine, even the "native" NIP copolymers having at least a 50 wt % content of the divinylbenzene (DBV) monomer exhibit some degree of binding affinity for caffeine, although they generally exhibit lower selectivity than do the corresponding inventive MIPs formed using caffeine as a TIE. This native affinity enables NIP matrixes to absorb caffeine and its congeners and isomers to some extent, some even exhibiting fairly high caffeine extraction levels of between 50 to 75 wt %, but with lower selectivity factors, so that treatment using these comparative NIP materials results in significant and undesirable changes in the aroma, smell and taste of the resulting decaffeinated beverage, particularly coffee. To measure the native affinity of NIPs in order to determine the dependence on the copolymer composition, a series of copolymers made with various ratios of DVB:MMA were prepared, those having higher DVB percentages conjectured to be more hydrophobic due to the aromatic functionality imparted by the DVB monomer, while those with higher MMA percentages likely being more hydrophilic due to the carboxylic acid moiety of the MMA monomer. It was observed that the overall extraction levels of caffeine did tend to increase with increasing DVB content, comparative NIP examples prepared using 70:30 (data point 305, Comparative Example C) exhibiting about 53 wt %, 75:25 (data point 310, Comparative Example K) exhibiting about 64 wt % and 85:15 (data point 309, Comparative Example J) exhibiting an extraction level (efficacy) of about 73 wt %. It is seen that in general that DVB:MMA copolymers with higher DVB content exhibit greater caffeine affinity while the overall selectivity factor is fairly low. These comparative examples were tested under equilibrium conditions where they were exposed to a caffeine beverage for at least 12 hours. However, for practicality for use in the present invention, these same materials are not that effective in achieving bulk caffeine removal within short times like one minute. For example, the same 85:15 DVB:MMA NIP copolymer exhibiting high extraction efficacy at equilibrium conditions (data point 309), only achieved about 10% extraction efficacy when the exposure time was shortened to one minute (data point 301, Comparative Example H), even though the selectivity factor was favorable, being greater than about 2 with respect to 3,7-dimethyl xanthine. A general trend observed with the comparative MIPs and NIP matrices was that selectivity decreased with longer exposure times, suggesting that with respect to general absorption efficacy, other congeners of caffeine had slightly poor affinities, so that with longer exposure times these competing materials were more favored than caffeine. In contrast, the inventive MIP copolymers of the present invention exhibit excellent extraction efficacy while preserving the favorable caffeine-specific binding properties sought in a molecularly imprinted polymer. However, the combination of some undifferentiated native efficacy combined with the favorable, high-selective affinity of the TIE imprinted resulting MIP matrices, results in an improved extraction system that also exhibits favorably high selectivity not seen in the prior art following short time exposure times of about one minute or so.

When allowed to reach equilibrium conditions, which typically requires exposure of the MIPs to the beverage or test solution to be decaffeinated for a period of time in excess of 12 hours, most MIPs are effective at achieving fairly high levels of caffeine extraction. However, with these long exposure (submersion) times, selectivity for caffeine decreases dramatically, as discussed above for reasons believed that with greater time exposure time, additional congeners of caffeine are eventually absorbed even if their binding efficacies are significantly lower than that of the target imprinted entity, caffeine. This is even particularly pronounced when the native copolymers exhibit a (non-selective) affinity for caffeine and its congeners having aromatic and hydrophobic properties owing to their structural similarities. When these system are exposed for short times of interest to the present invention, of about one minute contact time or less, the performances suffer dramatically, as seen in Comparative Example H (data point 301 in FIG. 3) in which a one minute exposure time only provides for about 10% of caffeine extraction, although the selectivity factor is favorably above 2. Accordingly, these and other comparative MIPs that fall upon trend line A are not useful for the purposes of the present invention as they are not capable of quickly absorbing sufficient caffeine from a treated beverage within the desired time frame of about one minute or less. Trend line A is also illustrative of the general performance of a comparative non-inventive copolymer synthesized without a TIE template, but otherwise under similar conditions, but being non-imprinted polymers (NIPs).

Also shown in FIG. 3 are a series of inventive embodiments produced according to the present disclosure that exhibit much more favorable properties, and share performances that are seen to follow trend line B, including Inventive Example No. 6 (data point 306), No. 7 (data point 307) and No. 8 (data point 308) produced using either a higher template ratio or higher crosslinker ratio. When both a higher template ratio and higher crosslinker ratio are employed, the resulting inventive MIP matrices exhibit additional enhancement of removal efficacy and selectivity, as seen by Example No. 19 (data point 311), No. 16 (data point 312) and No. 14 (data point 313), which all exhibit around a 70 wt. % caffeine extraction level while maintaining selectivity towards caffeine with selectivity factors of around 2, and which tend to group along the indicated trend line C in FIG. 3. Not plotted in FIG. 3, but obtained by combining a very high template ratio of 4.27 with a high level of crosslinker (a lower P:C ratio of 28.4:1, the resulting inventive MIP Example No. 21 was found to exhibit both a high percent extraction level of 94 wt. % while also exhibiting an extraordinarily high selectivity factor of 5.5. These results suggest that a combination of using either a higher template ratio (T:P) or crosslinker ratio (P:C) results in inventive MIP copolymers exhibiting properties of combined selectivity and percentage extraction efficacies in the region between trend line B and trend line C, while combinations using both a higher template ratio and crosslinker ratio results in inventive MIP copolymers with even greater combined selectivity and extraction efficacies in the region around trend line C and the region above as shown in FIG. 3.

In another series of tests, decaffeination of a commercially available coffee was evaluated by using embodiments of the inventive MIP matrices to treat coffee beverages having varying amounts of caffeine present, in order to see the effect on selectivity for shorter treatment times using a simple device consisting of the selected MIPs rendered to fine particle size and placed within a empty tea bag that was then resealed and introduced into the beverage immediately after brewing. Table 2 shows the levels of theophylline (mg/L) and chlorogenic acid (mg/L) present in coffee beverages obtained from brewing Starbucks Pike Place Coffee and Starbucks Decaffeinated Pike Place Coffee, both of which have significant levels of both congeners, although the level of chlorogenic acid in the decaffeinated version proved to be nearly twice as high as that in the caffeinated version. The two beverages where then combined at an appropriate volume/volume ratio to produce three test beverages containing 36, 160 and 350 mg/L of caffeine for treatment with the inventive Example No. 23.

The inventive embodiment Example No. 23 was effective at removing nearly all the caffeine, 94% when present at a relatively low level of 34 mg/L. When typical caffeine levels are present, around 160 mg/L, Example No. 24 is seen to remove about 72% of the caffeine. With very high levels of caffeine (about 1.5 times higher than the average amount of 250 mg/L), Example No. 25 is seen to only remove about 39% of the caffeine within the one minute time frame of treatment, believed to be due to saturation effects, the total amount of inventive MIP copolymer used having absorbed it's capacity limit. However, selectivity of caffeine removal remains favorable over the range of treated beverages, with the Example embodiments No. 23, 24 and 25 all exhibiting significantly reduced absorption of at least one of the two congeners, thus having higher a selectivity factor for caffeine that suggests that selectivity is in part influenced by the amount of initial caffeine being present. Example embodiments No. 23 and 24 showed very favorably selectivity factors with respect to theophylline (a mass ratio of absorbed caffeine to absorbed theophylline) of 54.9 and about 8.2, respectively. Example embodiments No. 23 and 25 showed very favorably selectivity factors with respect to chlorogenic acid (a mass ratio of absorbed caffeine to absorbed chlorogenic acid) of about 2.1 and about 15.5, respectively. As discussed above, when larger amounts of caffeine are present, the caffeine templated sites prefer and tend to absorb caffeine with higher efficacy initially, and tend to therefore absorb less of the caffeine congeners. However, with initially lower amounts of caffeine (and yet comparable levels of congeners) then both caffeine and the congeners are more readily absorbed, resulting in less favorable selectivity. Accordingly, the amount of the inventive MIP matrices as well as the treatment or exposure time can be selected based on the amount of caffeine present, in order to optimize the removal of this selected species while lowering the removal of the congeners (i.e. a higher selectivity value). Thus in one series of embodiments, the inventive MIP matrices of the present invention can be used by packaging into a device wherein the amount of MIP material used is adjusted for a particular level or range of levels of caffeine to be removed, so that the desired level of caffeine is extracted with minimal absorption of other species present.

TABLE 2

| SAMPLE # | Caffeine (mg/L) | Theophylline (mg/L) | Chlorogenic Acid (mg/L) | % Removal Caffeine | Selectivity Theophylline (4) | Selectivity Chlorogenic Acid (5) |
|---|---|---|---|---|---|---|
| F (1) | 570 | 5.1 | 120 | — | — | — |
| G (2) | 34 | 6 | 210 | — | — | — |
| 23 | 36 | 4.4 | 100 | 94 | 54.9 | 2.12 |
| 24 | 160 | 4.6 | 140 | 72 | 8.23 | −(3) |
| 25 | 350 | 6.2 | 110 | 39 | −(3) | 15.5 |

(1) Untreated beverage: Starbucks Pike Place Coffee
(2) Untreated beverage: Starbucks Decaffeinated Pike Place Coffee
(3) Not measured
(4) Selectivity equal to ratio of extracted Caffeine (mg)/extracted Theophylline (mg)
(5) Selectivity equal to ratio of extracted Caffeine (mg)/extracted Chlorogenic Acid (mg)

In one series of embodiments, the inventive MIP matrices were first pre-impregnated with a weak solution of decaffeinated coffee prior to treating a cup of normally caffeinated coffee to determine whether there would be any beneficial increase in the efficacy of the MIP particles to absorb caffeine with lessened impact owing to the otherwise unwanted absorption of other caffeine-like materials, such as theobromine and the like. By washing the polymer with a weak decaffeinated coffee solution prior to testing, it was found that selectivity for caffeine is significantly improved, as disclosed herein with regard to the observed aliquot effect when the inventive MIP matrices are used in a repetitive manner in multiple treatment steps to treat a volume of caffeinated beverage.

Without being bound by theory, it is believed that by exposure of the inventive MIP matrices to a zero or reduced caffeine containing beverage, that other caffeine-like materials become bound to some extent to binding sites within the MIP particles, acting to reduce the later tendency of the pretreated MIP materials to absorb more of these caffeine-like materials during actual intended use to decaffeinate a beverage with the second exposure, without lowering the amount of caffeine absorbed or the capacity of the MIP matrices.

In related embodiments, other coffee or tea-derived materials, including acidifiers, coffee essential oils, flavorants, odorants, colorants, taste enhancers, and other flavor and aroma modifiers, and combinations thereof, could be used to pretreat the inventive MIP matrices to produce either a preservation of the flavor associated with the original, pre-treatment caffeinated beverage by effectively replacing any materials that would otherwise be potentially absorbed during the decaffeination process, or yet alternatively, adding additional materials to the decaffeinated beverage, as absorbed caffeine would then tend to displace preloaded materials of similar TIE properties, and other materials not significantly bonded to the MIP particles but present merely be deposition would be dissolved into, and pass into the decaffeinated beverage during the treatment process to produce a modified or enhanced aroma, odor, taste, color or other desirable sensory characteristic in the treated beverage.

In yet further related embodiments, other non-coffee and non-tea derived materials, including acidifiers, coffee essential oils, flavorants, odorants, colorants, taste enhancers, and other flavor and aroma modifiers, and combinations thereof, could be used to pretreat the inventive MIP matrices, having been selected so as to release into the aqueous beverage to some extent preferably in totality during the duration of the decaffeination treatment process so as to produce a modified or enhanced aroma, odor, taste, color or other desirable sensory characteristic in the treated beverage.

Successive Aliquot Treatments

In another study, a first treatment step A using 3 g of polymer (dry weight) in the form of the inventive MIP beads was added directly to the coffee, then stirred 10 seconds and then the polymer beads were removed by filtration through a paper filter. A second treatment step B was applied to the filtered solution using the same, recovered first 3 g of MIP beads used in the first treatment step A, added again to the coffee, then stirred for an additional 10 seconds and isolated from the treated beverage by a second filtration step. Results show that the subsequent measured percentages of reduction of the level of caffeine corresponded to a removal of 37% and 72%, with respect to the initial quantity of caffeine present, for the first and second treatment steps A and B, respectively. Thus, in some embodiments of the present invention, methods of using the MIP polymers, matrices and devices constructed therewith my employ a series of two or a plurality of successive treatments of the beverage to be treated, in order to provide an opportunity for the eventual consumer to "tailor" their level of caffeine in coffee, for example, by repeated dipping of a device employing the inventive MIP particles for a shorter time until a desired degree of caffeine reduction has been achieved. In other related embodiments, a similar method could be employed to tailor the desired removal of caffeine from other beverages including teas, colas, soft drinks, other plant extracts as well as artificially caffeinated beverages and drinks.

Sensory Evaluation

Testing was performed using one embodiment of the present invention on Test Sample F, using Pike Place Starbucks Coffee as the source of caffeinated coffee treated using a small quantity of the MIP matrix, and the same brand of commercially decaffeinated coffee (Pike Place Starbucks Decaffeinated) as a control Test Sample G. Samples of all were brewed using a Keurig® K-Select™ single cup coffee brewing machine (available from Keurig Green Mountain, Inc., 33 Coffee Lane, Waterbury, Vt. 05676 USA), programmed to deliver 10 ounces of brewed beverage. For samples treated with Example No. 22 approximately 9.0 g (corresponding to about 5.0 g dry weight of the polymer) of a hydrated inventive MIP matrix in the form of fine particles (beads) was post-added to a 10 ounce brewed aliquot of coffee and allowed to remain in contact for approximately one (1) minute contact time after an initial stirring by hand for about 2-3 seconds to insure that the bulk of the particles of the polymer were wetted. After one minute, the treated aliquots of coffee were poured and filtered through a Whatman #4 cellulose filter into a sampling cup and examined to insure that no polymer beads were present, and then refrigerated for later testing. Once all test samples and controls were prepared, either by brewing only or brewing followed by treatment using the inventive MIP matrices as described above, they were all placed in a refrigerator until they reached a uniform temperature, and then a small 10 ml aliquot was pipetted from each and saved for HPLC (high performance liquid chromatography) evaluation of remaining caffeine levels in solution.

For the sensory tests, five (5) individuals were asked to evaluate on a scale of 1-5 their perception of change of taste; change in color; change in aroma and change in acidity, as well as an overall preference between the original coffee and its inventive MIP polymer-decaffeinated form. Immediately prior to sensory testing by the individuals, the remaining volume of each coffee was removed from refrigeration and brought back to a warm state by heating simultaneous test pairs of the samples in a microwave until warmed to drinking temperature, or about 100° F. At this time, each individual smelled, visually observed and then tasted the beverage in each cup, and then immediately completed a sensory evaluation form scoring each of the above disclosed parameters on a scale of from 1 to 5, where 3 represents a neutral perceptual rating of no perceivable change or no preference, between the original coffee and an identical preparation post-treated with the MIPs polymer. Samples were presented blind (no labelling) but not randomized amongst the testers owing to the small sampling set, as only rankings were desired instead of statistically extractable results. In addition, the evaluating individuals queried after the testing was completed as to their usual preferences regarding using decaffeinated coffee and whether they liked mild, medium or strongly brewed coffee. None of the samples were treated with sugar, sweetener, milk or cream additives, but tasted as is or black.

Scoring of the samples corresponded to a 1-5 scale as follows: With regard to any perceived change, a score is assigned by the evaluator spanning a value of from 1 to 5, 1 being no perceived change, 2 being a very slight change, 3 being a minor change, 4 being a noticeable change and 5 being a significant change or difference between caffeinated and decaffeinated samples.

With regard to a subjective preference for the attribute, irrespective of whether or not a perceived change was noted, a score is assigned by the evaluator spanning a value of from 1 to 5, a score of 1 being a preference for the original, untreated caffeinated coffee sample, 5 being a preference for the treated, decaffeinated coffee, 2 and 4 being slight preferences for untreated and treated, respectively, while 3 denotes no preference between the two samples.

Testing results are shown in the Table 3 below following treatment of a standard one-cup brewed coffee beverage that was post treated by 1 minute exposure to 3.5 g of an inventive MIP matrix in the form of 20 um particles per approximately 250 g of beverage. Five panelists tasted samples of the original beverage, and its equivalent after the decaffeination process. The samples were prepared in advance, labelled in a double-blind manner so that participants did not know the source or treatment of the sampled material, and all samples were reheated to a uniform, post-brew temperature of approximately 150° F. prior to tasting to eliminate any bias from the cooling off of the test samples. Panelists filled in a short questionnaire during the tasting process, assigning scores of between 1-5 for a selected set of parameters as shown in Table 3. The average values of the responses for each question then being calculated and reported.

TABLE 3

| Sensory Evaluation (1) | Score (2) | Comparative Evaluation | Score (3) |
|---|---|---|---|
| Change in Taste | 3.2 | Taste Preference | 3.5 |
| Change in Color | 3.4 | Color Preference | 3.0 |
| Change in Aroma | 4.0 | Aroma Preference | 3.1 |
| Reduced Acidity | 3.3 | Acidity Preference | 2.5 |
|  |  | Overall Preference | 2.7 |

(1) Testing of same brand of coffee, being the regular caffeinated coffee and a polymer treated sample under the conditions disclosed
(2) Score of 1-5, 1 being no perceived change, 2 being a very slight change, 3 being a minor change, 4 being a noticeable change and 5 being a significant change or difference between caffeinated and decaffeinated samples, and intermediate scores
(3) Score of 1-5, 1 being a preference for the original, untreated caffeinated coffee sample, 5 being a preference for the treated, decaffeinated coffee, 2 and 4 being slight preferences for untreated and treated, respectively, while 3 denotes no preference between the two samples.

Sensor results as shown in Table 3 reveal that the use of an inventive MIP polymer according to the methods of the present invention does have a moderate effect with regard to changing the perceived taste, color, aroma and "acidity" of a decaffeinated coffee, as expected owing to the removal of nearly all of the caffeine moiety previously present in the original fully caffeinated coffee sample tested. Caffeine is known to contribute to the perception of "acidity" as well, historically being attributed to contributing to the bitter taste of coffee. The pKa of caffeine is 14.0 at 25° C. and 10.4 at 40° C., the pH of a 1 weight % solution being around 6.9 (O'Neil, M. J. (ed.). The Merck Index—An Encyclopedia of Chemicals, Drugs, and Biologicals. Cambridge, UK: Royal Society of Chemistry, 2013., p. 289), so it is not unexpected that a significant reduction in caffeine levels will result in a perceptual change. Use of MIP matrix embodiments with very high caffeine removal efficacies may suffer slightly from the undesired absorption of caffeine congeners, but this may be partly mitigated by reducing the amount of the inventive MIP copolymers used, so that the amount present is just barely sufficient to achieve the desired degree of caffeine uptake, so that minimal excessive binding capacity remains available to absorb minority congeners present after the MIP becomes saturated with the primary caffeine absorbate.

However, more important than a perceived change, is whether the change is acceptable, or favorable or unfavorable to the user of the present invention. This was assessed by also querying the taster's preference with regard to the four characters selected. Of the five tasters selected, none regularly drank decaffeinated coffee so as to challenge the decaffeinating method to the greatest extent. In general, drinkers of decaffeinated coffee prefer a milder tasting or less strongly brewed coffee, or become habituated to the altered taste of decaffeinated coffee, which the control test confirmed was altered even with the commercially available decaffeinated version, which is believed to have been decaffeinated by chemical means using methylene chloride.

In Table 3, it is seen that despite sensory changes in the perception of taste, color and aroma, that the MIP polymer decaffeinated samples all scored around a median value of between 3.1 to 3.5, meaning that despite a change, the tasters did not have a strong preference either way on these individual sensory characteristics, despite an overall preference (2.7) score slightly in favor of the original caffeinated coffee. In evaluation of the taster's comments, it was evident that those preferring a "stronger" or slightly "more bitter" tasting coffee preferred the caffeinated version of the coffee. However, overall results show that decaffeination using the polymers and methods of the present invention produce a decaffeinated coffee that is nearly indistinguishable from a commercially, chemically decaffeinated coffee and does so with a nearly neutral preference in respect to the taste, odor and aroma of a comparable fully-caffeinated beverage.

Accordingly, the embodiments of the inventive MIP matrices disclosed herein are effective at rapid decaffeination of high-caffeine containing beverages within one minute or less contact time, while having minimum effects on the sensory perception of appearance, odor and taste compared to other decaffeination means, thus provided an easy and convenient means for a consumer to treat a beverage such as coffee or tea to reduce or remove nearly quantitative levels of caffeine at their preference, by using a device employing the inventive MIP matrix materials reduced to the form of a bead, fine particles or fibers.

Mechanical Decaffeination Devices

FIG. 6 shows several embodiments of a mechanical single-use wand-style decaffeination device 600 employing one or more inventive MIP matrices as disclosed herein. In the first embodiment, a lollipop-style wand 601 features a handle means 603 attached by means of a junction 604 to an upper region of an outer housing 606 of the decaffeination pod 612 that holds one or more containment housing 608 means that contain a plurality of MIP beads 610 or alternatively MIP matrix material in the form of a powder.

In the second embodiment, a cylinder-style wand 602 features a handle means 603 attached by means of a junction 604 to an upper region of an outer housing 606 of the decaffeination pod 614 that holds one or more containment housing 608 means that contain a plurality of MIP beads 610 or alternatively MIP matrix material in the form of a powder.

In a third embodiment, a cylinder-style wand 605 that is composed of a unitary block of the inventive MIP matrix materials formed into a micro-foamed polymer sponge 616 is featured, with an attachment means or junction 604 serving to connect the sponge 616 portion to a lower end of the handle means 603. For this embodiment 605, as well as for embodiments 601 and 602, the relative lengths of the respective lower functional portions of the inventive device 612, 614 and 616, have lengths that are preferably at least twice as long as their respective widths, so that they can be submerged into a liquid and have their entire lengths under the surface of the liquid in a typical volumetric configuration as presented by a mug of coffee or cup of tea or a glass of caffeinated beverage such as a soda, while the upper portion of the respective handles 601 remain above the surface of the particular liquid beverage being treated, allowing the stirring and manipulation of the inventive devices by hand of the user, and providing for easy insertion and removal from the liquid.

Not shown in FIG. 6, but included herein as a forth embodiment of a treatment device is a fan-style decaffeination tool 607 constructed using a handle portion as disclosed connected by a similar junction means as described herein to a submersible portion comprising a single or multiply-folded sheet of the MIP matrix copolymer material present in the form of a thin sheet, membrane or non-woven cloth with one or a plurality of vertically-oriented folds that are gathered on at least a top portion by a suitable securement means, such as a staple, pin, cement or bond formed by heat, pressure, sintering or the like. In this configuration, the thin sheet, membrane or non-woven cloth made from the inventive MIP copolymer material offers a high surface area and mechanical means to stir the treated beverage. Optionally, the opposite, distal or bottom portion of the folded sheet can also be gathered and secured to prevent the opening of the folds during submersion. In related embodiments, the sheet material can be folded singly, in a "V" configuration, or feature multiple folds corresponding to N, M and W folds, and combinations thereof. By increasing the number of vertical folds, the physical size (cross-sectional dimension or width) of the submersible fan-style decaffeination tool can be minimized while still providing a large surface area of material comparable to the other forms of the MIP matrix materials disclosed above, without requiring a secondary containment means as do the particle or bead forms of the inventive copolymers. Not shown in FIG. 6, but included herein as a fifth embodiment of a treatment device 609 is the MIP matrix copolymer material present in the form of a thin sheet, membrane or non-woven cloth that is in a rolled configuration, rather than folded, with at least one upper edge or portion of the rolled material gathered and either secured as disclosed herein, and/or attached to the lower portion of the handle portion of the device. In yet another closely related embodiment, is a treatment device 611 combining a multiply-folded sheet in a pleated configuration with a plurality of either vertically-oriented and/or horizontally-oriented folds (pleats) that are then collected into a rolled configuration, with at least one upper edge or portion of the rolled material gathered and either secured as disclosed herein, and/or attached to the lower portion of the handle portion of the device.

During use, the wand-style decaffeination tools 600, whether using configuration 601, 602 or variations thereof with respect to overall shape, orientation and attachment means 604 of a MIP containing housing 606 or folded, pleated or rolled sheet construct (607, 609, 611) to a handle 603, are submerged into a liquid beverage to be treated, preferably so that most if not all of the MIP beads 610 are contacted with the liquid and remain submerged under the surface of the liquid for the desired treatment time or duration, optionally with some stirring or motion, or at least some initial movement to insure wetting of the entire housing portion 606 to ensure fluidic contact between the inventive MIP materials and the beverage. When using the inventive MIP matrix materials of the present invention, a treatment time of less than about one (1) minute is sufficient to achieve greater than about 95% removal of caffeine from a regular strength, typically brewed coffee beverage having an average of about 250 mg/L of caffeine present, when using about 3.5 grams of a representative embodiment of the inventive MIP copolymer. The tools 600 can also be used by dipping into the liquid beverage for a shorter time to achieve partial decaffeination, allowing a consumer the choice of removing the desired amount of caffeine, rather than fully decaffeinating the beverage. In a related embodiment in which the consumer wishes to only partially decaffeinate a first beverage, said first beverage can be treated with one or more of the example device embodiments disclosed here using the inventive MIP matrix materials to achieve a first degree of decaffeination for a shorter duration than about one minute to achieve less than complete decaffeination, and then the same device for second period of time to treat a second beverage to achieve a second degree of decaffeination also being less than complete, and the process optionally continued to treat a third beverage until the example device is exhausted, in that it has absorbed the full capacity of caffeine possible and is then no longer able to decaffeinate a beverage. In a related embodiment using a larger quantity of the inventive MIP matrices, for example a quantity four times in mass as that mass needed to decaffeinate a single 250 mL size (cup size) of coffee, an inventive device sufficient to decaffeinate a pitcher or carafe of coffee beverage having four times the volume (approximately 1 L) is employed. In similar related embodiments, the size and mass of the MIP matrix materials used, and the configuration, size, shape and orientation of the decaffeination tool can be configured in any manner as needed in order to provide a device that enables manipulating of the MIP matrix materials within some outer housing means 606 and optionally some containment means 608 to prevent loss of the MIP materials from the device, or transport of the MIP materials from the device to the beverage, having at least one handle 603 or similar attachment means that enables the containment portion 608 to be lowered into a beverage and retrieved from said beverage without the user's fingers, hands, or appendages from contacting the beverage itself.

Another inventive embodiment is a decaffeination device in the form of a sleeve composed of the inventive MIP copolymers or a MIP matrix comprising a structure composed of fibers, compressed particles, foam or micro-foam copolymer, sized and geometrically configured to fit within a receptive cup, such as a coffee cup, wherein the sleeve is sized to fit snugly within the inside of the cup, positioned as an interior liner covering at least a substantial surface area of the interior surface of the receptive cup. The thin sleeve can in one embodiment be a tapered truncated frusto-cylindrically-shaped tubular insert with both an open top and open bottom, tapered in a corresponding and complimentary manner so as to slide into the receptive cup and be frictionally retained by intimate contact between an exterior surface of the sleeve and the interior surface of the receptive cup, so that it can be inserted therein, a charge of beverage to be decaffeinated added into the assembled cup and sleeve, so that the beverage makes contact with the sleeve composed of the inventive MIP copolymers, starting the decaffeination process. In a related embodiment, the sleeve can be in the form of end-capped frusto-cylindrically-shaped tubular insert with the smaller, bottom end of the device being closed and made of the same MIP copolymer, either in one continuous form or by some suitable means of attaching an end portion such as by crimping in a manner similar to that used to construct a paper cup, the sleeve insert being essentially in the form and shape of a paper cup sized and geometrically configured to fit into a receptive cup of matching slope, size and geometry to form a snug lining within. In a related embodiment, the upper portion of the sleeve may be terminated so that when inserted, the upper portion of the sleeve does not extend beyond or above the upper rim of the receptive cup, or in a related embodiment is terminated so that its upper end terminates at some point intermediate below said upper rim so as not to come into contact of the lips of a person drinking from the assembled sleeve and cup. In these above and other embodiments presented below, the thickness of the liner can be selected as needed so as to provide a sufficient amount of the inventive MIP copolymer or MIP matrix present in order to achieve the desired degree of decaffeination of a beverage to be placed within the sleeve or assembled sleeve and cup device, or interior coated device as disclosed below in greater detail.

In yet another series of related embodiments, a thin coating of the inventive MIP copolymer or MIP matrix can be applied to a substantial area of an inner portion of a receptive cup, such as for example, but not limited to a disposable plastic, paper, styrofoam or other composite or recyclable material fabricated cup, the thin coating forming a lining on one or more interior surfaces therein to provide a sufficient amount of the inventive MIP copolymer or MIP matrix present in order to achieve the desired degree of decaffeination of a beverage poured or placed inside the integrated cup-style decaffeination device. In a series of related embodiments, the inventive MIP copolymer sleeve insert or interior surfaces of a cup device coated to some extent with said MIP copolymers, can be sized to provide just the necessary and sufficient quantity of the inventive MIPs required to provide a desired degree of decaffeination, such as for example, but not limited to, a device able to reduce caffeine by 100%, or alternatively by 75%, or yet alternatively by 50% or alternatively reduce the caffeine content of a beverage exposed therein to a selected amount of caffeine remaining in the treated beverage, such as for example, but not limited to, reducing the beverage's caffeine level to 10 mg/ml, or alternatively to 50 mg/ml, or alternatively to 100 mg/ml, or yet alternatively to some predetermined and desired final caffeine concentration irrespective of the cumulative and corresponding percent reduction of caffeine based on the initial caffeine content present within the untreated beverage prior to treatment by the inventive device.

Figure 7:
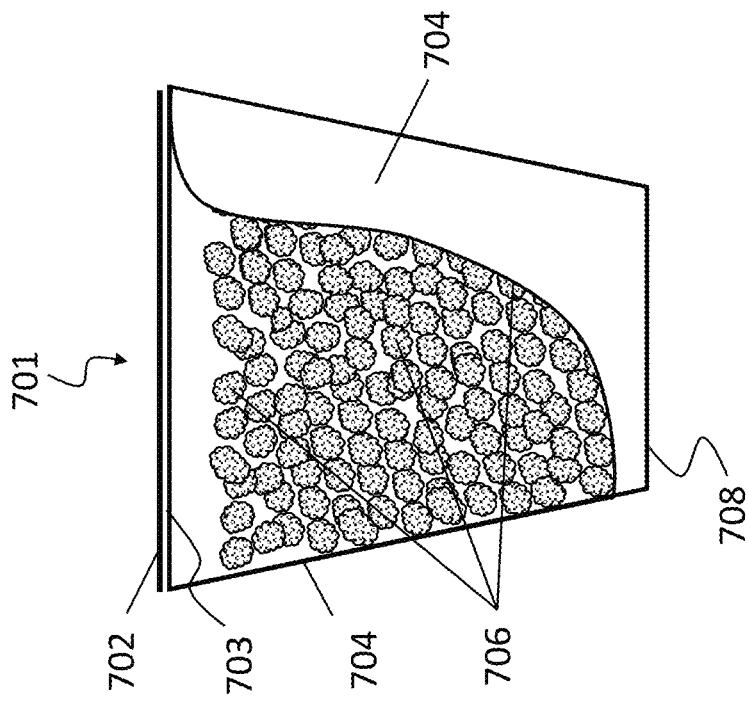
FIG. 7 shows a typical pod-style cartridge for brewing a beverage using an automatic brewer.

In addition to manual means of employing an inventive device having the MIP matrix materials present as disclosed above, the present invention further contemplates use of the inventive MIP copolymers in an automatic brewing machine that can prepare brewed beverages, for example including but not limited to coffee, tea and chocolate beverages. In these embodiments, the inventive MIP matrix materials can be present within a brewing pod, for example the K-Cup® pod, available for use on Keurig® K-Select™ single cup coffee brewing machines (available from Keurig Green Mountain, Inc., 33 Coffee Lane, Waterbury, Vt. 05676 USA). Forms of the inventive MIP matric materials suitable for use within a pod include powder, beads, encapsulates, fibers and foam constructs of the inventive copolymers. In FIG. 7, a conventional pod-style brewing insert 701 is illustrated having a top foil seal 702 located on and sealing the upper top perimeter 703 of the cup, which is generally in the shape of a bitruncate frusto-cylindrical cone with a top 703 and bottom 708 perimeter and termination, respectively, formed having an enveloping wall 704 that contains freely packed granules of coffee 706. The pods are typically composed of a plastic polymer in the form of a thin film or wall, of generally uniform thickness throughout the wall and bottom surfaces thereof, with a top opening 703 being sealed with a foil or foil-like membrane 702 to preserve the freshness of the coffee and seal the pod against the environment before use. When the pod-style brewing insert 701 is then placed into the corresponding brewing machine, an inlet means, such as a hollow needle or tube-like stylus effectively pierces some point along the top foil seal 702 allowing the introduction of cold or hot water into the pod interior. Simultaneously when 701 is placed into the brewing machine, an outlet means, typically a second hollow needle or tube-like stylus pierces the thin plastic membrane at some point located on the bottom surface 708 of the pod to provide an outlet means. During automatic brewing, water or hot water is passed into the pod by means of the first inlet means, wetting the coffee granules within the pod 701, and then exiting the pod through the bottom 708 by means of gravitational flow of liquid within the pod interior through the outlet means to a receiving cup or mug that collects the brewed beverage as it is automatically generated.

Figure 8:
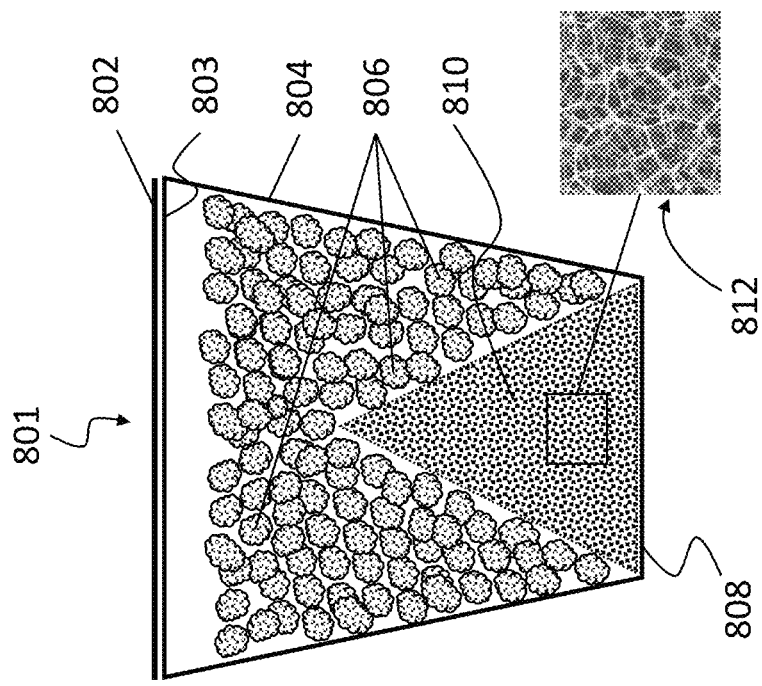
FIG. 8 shows an improved pod-style cartridge with a unitary micro-foamed MIP insert present.

In order to use the inventive MIP matrices in a similar brew cup device, FIG. 8 shows one embodiment in which the MIP matrix is present as a conical foam construct 810 composed of micro-foamed MIP copolymer 812, located on the bottom of the cup in contact with the exterior side of the bottom wall 808 or membrane, and surrounded by a plurality of coffee grounds 806 contained within the cup and sidewall 804, the conical foam construct 810 sized and positioned so that as water is introduced into the cup 801, the resulting beverage formed has to wet and flow through at least a portion, if not through the bulk cross-section of 810 in order to flow out the bottom 808 of the pod through some outlet or outlet means provided by the machine when loading the pod, not shown but as described hereinabove with regard to a conventional K-Pod or brew cup device 701. The inventive MIP copolymers as described herein can be produced as micro-foamed copolymer matrices by using commercially available industrial foam blowing techniques, such as the process used to produce foamed melamine products identified by the brand name Basotect™, manufactured by BASF SE, a division of the BASF Corporation, located at 100 Park Ave., Florham Park, N.J. 07932, U.S.A., which are micro-foamed melamine resins that exhibit excellent wettability, dimensional stability and an extensive open cell, porous network of filaments (see Figure magnification detail 812) providing large internal surface area per unit volume. When the inventive MIP copolymers are in a micro-foamed physical foam, they exhibit similar properties to the Mr. Clean Magic Eraser™, a product of The Proctor & Gamble Co., 1 P&G Plaza, Cincinnati, Ohio 45202 U.S.A., in which a similarly hard and brittle polymer, melamine resin, is transformed into a contiguous, porous and water permeable, high internal surface area, filamentous sponge. For the inventive MIP matrix copolymers, this micro-foamed form exhibits similar physical properties in addition to the advantages of providing an extremely high surface area polymer matrix where the TIE sites formed within the MIP matrix are believed, without being bound by theory, to be nearly 100% accessible for adsorption of the targeted caffeine when submersed into a caffeinated liquid, and further offers the advantage of not needing secondary containment (similarly for the inventive MIP matrix copolymers in the form of continuous fibers) as there are essentially no fine particles or beads present needing containment to prevent their migration into the liquid beverage undergoing the inventive treatment disclosed herein.

As applied to the inventive MIP copolymers, the resulting micro-foamed MIP matrices have the advantage of being not requiring containment or secondary means, such as for example, a filter or membrane, to retain undesired particles or beads. In addition, owing to the ease of wettability of open cell structure, the degree of prehydration of the MIP matrices is believed to be significantly reduced compared to non-foamed matrices of the same inventive copolymer composition.

Figure 9:
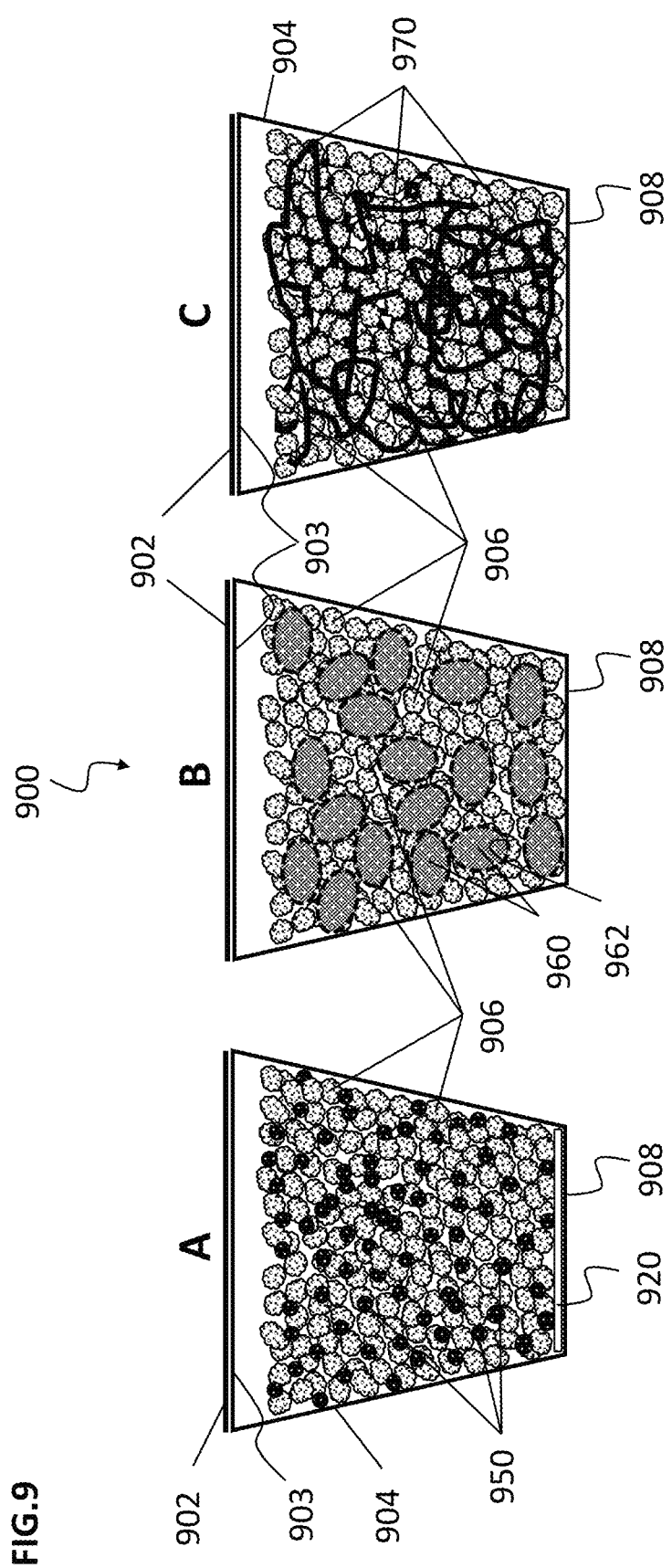
FIG. 9 shows three versions A, B and C of improved pod-style brewer cartridges with MIP powder, MIP beads and MIPs in the form of macroscopic fibers present.

In other related embodiments, as shown in FIGS. 9 A, B, C, the inventive MIP matrices can also be present with alternative cup styles 900 either in the form of a plurality of MIP copolymer beads 950 or particles 950 dispersed amongst the coffee granules 906, or in the form of a plurality of MIP copolymer particles in powder form within permeable capsules 960 formed having a permeable membrane, wall or shell 962 completely encapsulating and surrounding a plurality of particles, the permeable capsules 960 themselves dispersed amongst the coffee granules 906, or in the form of one or more continuous fibers of MIP copolymer material 970 that is also dispersed amongst the coffee granules 906. For brew cup embodiment A, the brew cup 904 also features a porous or permeable filter disc 920 located at the bottom 908 surface of the brew cup, so that as water flows into the cup interior from the top and brewed beverage exits the cup through a piercing or opening in the cup bottom 908 it exits without carrying any free MIP beads of particles 950, these being retained on the surface or though the bulk of the filter disc 920. Accordingly, the optional filter disc 920 is ideally composed of a material that is wettable, allows water and liquid beverage to freely pass through, but has sufficiently small pore sizes or free openings so as to prevent the MIP matrix materials from passing through when in the form of MIP beads 950 or MIP particles 950. In brew cup embodiments B and C, the MIP matrix materials do not necessarily need a secondary containment or filtering means, the former featuring the MIP particles or beads within permeable or porous capsules and thus contained therein, the latter having the MIP matrix present in the form of relatively long fibers or collection of fibers, whose lengths provide sufficient entanglement so as to prevent their migration or being flushed from the brew cup during a brewing operation.

Acrylamide MIP

Recently, growing concern about the presence of small residual quantities of acrylamide, a chemical compound of concern with regard to toxicity and potential mutagenicity, has surfaced owing to the detection of this material in roasted and processed coffee beans, believed to be formed, in part, by the drying and curing processes which are typically conducted at higher temperatures to 'roast' the coffee or coffee bean, a process that dehydrates and modifies the components of the beans to produce a more desirable taste, odor and appearance, generally a stronger, more bitter or acrid taste and a darker color when subsequently brewed to make a beverage.

Recent studies have shown that coffees originating from different sources can have an initial acrylamide content of between 250-600 ppb (parts per billion) after roasting, but prior to brewing, with reductions in free acrylamide content after subsequent brewing to levels of between 5 to 15 ppb, a significant reduction but not a complete removal of the undesirable material.

Accordingly, owing to the ability of MIPs to selectively absorb and remove undesirable materials from beverages, the present invention also includes embodiments wherein an additional amount of a MIP imprinted polymer matrix with free acrylamide as a TIE and/or an acrylamide-like material or TIE having an acrylamide moiety present, or optionally similarly structured isomers and derivatives thereof, is employed in addition to the inventive MIP matrices to produce a decaffeinated or reduced caffeine containing beverage also having reduced levels of acrylamide remaining.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A method for decaffeination of a serving-sized volume of a caffeinated beverage comprising:
   (a) selecting a caffeinated beverage;
   (b) partially submerging a single use device in said beverage for a time period of less than or equal to one minute; and
   (c) removing said device from said beverage within said time period; wherein said single use device comprises:
   (i) a treatment means having a handle connected at its lower end to an upper end of an outer housing, a containment housing, and a plurality of molecularly imprinted polymer (MIP) particles; wherein said outer housing is adjacent to and surrounds said containment housing; and wherein said containment housing surrounds said plurality of MIP particles; wherein said treatment means is placed into a liquid beverage by means of said handle means; an upper region of said handle means being manipulable by hand; wherein said plurality of MIP particles comprise a molecularly imprinted copolymer of divinylbenzene monomer and methylmethacrylic acid having a respective molar ratio of between 80:20 and 95:5; wherein said MIP particles are capable of absorbing at least 25 milligrams of molecular caffeine per gram within 60 seconds of submersion within said caffeinated beverage; wherein said MIP particles are formed as a three dimensional polymer matrix in the presence of a target imprinted entity dispersed in a solvent carrier wherein said target imprinted entity is molecular caffeine; and wherein said serving-sized volume is a volume of liquid between 100 to 300 milliliters.

2. The method of claim 1 wherein said plurality of molecularly imprinted polymer particles are present in a pre-hydrated form within said single use device to improve wettability by said beverage during said partial submersion step.

3. The method of claim 2 wherein said plurality of molecularly imprinted polymer particles are pre-hydrated to a free moisture level of between 1 and 75 weight % water.

4. The method of claim 3 wherein said free moisture level is between 5 to 50 weight % water.

5. The method of claim 2 wherein said three dimensional polymer matrix is dried in a first step, then ground in a second step to produce a plurality of molecularly imprinted polymer particles; and then in a third step said plurality of molecularly imprinted polymer particles are pre-hydrated with water to a free moisture level of between 1 and 75 weight % water.

6. The method of claim 5 wherein said free moisture level is between 5 to 50 weight % water.

* * * * *